(12) United States Patent
Kim et al.

(10) Patent No.: US 12,033,544 B2
(45) Date of Patent: Jul. 9, 2024

(54) STRETCHABLE DISPLAY PANEL AND DEVICE AND MANUFACTURING METHOD OF THE SAME

(71) Applicant: LG Display Co., Ltd., Seoul (KR)

(72) Inventors: Eunah Kim, Seosan-si (KR); Hyunju Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 460 days.

(21) Appl. No.: 17/184,252

(22) Filed: Feb. 24, 2021

(65) Prior Publication Data

US 2021/0183277 A1 Jun. 17, 2021

Related U.S. Application Data

(63) Continuation of application No. 16/590,083, filed on Oct. 1, 2019, now Pat. No. 10,964,234.

(30) Foreign Application Priority Data

Oct. 8, 2018 (KR) .......................... 10-2018-0119622

(51) Int. Cl.
*G09F 9/30* (2006.01)
*G06F 1/16* (2006.01)
(52) U.S. Cl.
CPC ............ *G09F 9/301* (2013.01); *G06F 1/1626* (2013.01); *G06F 1/1652* (2013.01)
(58) Field of Classification Search
USPC ........................................................ 174/254
See application file for complete search history.

(56) References Cited

U.S. PATENT DOCUMENTS 9,040,337 B2 5/2015 Park et al.
9,536,860 B2 1/2017 Yoon et al.
(Continued)

FOREIGN PATENT DOCUMENTS

CN 101416302 A 4/2009
CN 107221550 A 9/2017
(Continued)

*Primary Examiner* — Stanley Tso
(74) *Attorney, Agent, or Firm* — Seed IP Law Group LLP

(57) ABSTRACT

Disclosed herein are a stretchable display panel and device and a manufacturing method thereof. The stretchable display panel comprises: a lower substrate having an active area and a non-active area surrounding the active area; a plurality of individual substrates disposed on the lower substrate and located in the active area; a plurality of pixels disposed on the plurality of individual substrates; and a connection line disposed between the plurality of individual substrates and the lower substrate, wherein the modulus of the plurality of individual substrates is higher than that of at least one part of the lower substrate, and wherein the connecting line extends to the bottom surface of the individual substrates, such that the connecting line electrically connects a pad disposed on the individual substrates without a step in the top surface of the connecting line. That is, the connecting line has a uniform height from the lower substrate for its entire length. Accordingly, the stretchable display device according to the present disclosure may reduce damage to the connecting line due to a step of the connecting line, so reliability of the stretchable display device may be improved.

12 Claims, 21 Drawing Sheets

(56) References Cited

U.S. PATENT DOCUMENTS

| | | |
|---|---|---|
| 9,841,548 B2 | 12/2017 | Kim et al. |
| 9,844,133 B2 | 12/2017 | Tomita et al. |
| 10,135,011 B2 | 11/2018 | Park et al. |
| 10,310,560 B2 | 6/2019 | Choi et al. |
| 10,959,326 B2 | 3/2021 | Okimoto et al. |
| 10,985,148 B2 | 4/2021 | Yueh et al. |
| 10,985,332 B2 | 4/2021 | Shin et al. |
| 2002/0094701 A1 | 7/2002 | Biegelsen et al. |
| 2004/0192082 A1 | 9/2004 | Wagner et al. |
| 2009/0283891 A1 | 11/2009 | Dekker et al. |
| 2009/0317639 A1 | 12/2009 | Axisa et al. |
| 2010/0155757 A1 | 6/2010 | Kim et al. |
| 2012/0051005 A1 | 3/2012 | Vanfleteren et al. |
| 2012/0062447 A1 | 3/2012 | Tseng et al. |
| 2012/0250323 A1 | 10/2012 | Velu |
| 2013/0088662 A1 | 4/2013 | Watanabe et al. |
| 2014/0131715 A1 | 5/2014 | Liu et al. |
| 2014/0217382 A1 | 8/2014 | Kwon et al. |
| 2014/0240932 A1 | 8/2014 | Hsu |
| 2014/0299362 A1 | 10/2014 | Park et al. |
| 2014/0340857 A1 | 11/2014 | Hsu et al. |
| 2015/0009129 A1* | 1/2015 | Song .............. G06F 1/1652 345/156 |
| 2015/0380355 A1 | 12/2015 | Rogers et al. |
| 2016/0172428 A1 | 6/2016 | Song et al. |
| 2016/0211483 A1 | 7/2016 | Kwon |
| 2016/0260915 A1 | 9/2016 | Park et al. |
| 2016/0293571 A1 | 10/2016 | Yoon et al. |
| 2017/0005077 A1* | 1/2017 | Kim .............. G02B 6/0041 |
| 2017/0086291 A1 | 3/2017 | Cotton et al. |
| 2017/0169918 A1 | 6/2017 | Park et al. |
| 2017/0192319 A1 | 7/2017 | Zhang et al. |
| 2017/0249886 A1 | 8/2017 | Choi |
| 2018/0046221 A1 | 2/2018 | Choi et al. |
| 2018/0090039 A1 | 3/2018 | Singireddy |
| 2018/0114947 A1 | 4/2018 | Kwon |
| 2019/0019441 A1 | 1/2019 | Shin et al. |
| 2019/0267440 A1 | 8/2019 | Park et al. |
| 2019/0280248 A1 | 9/2019 | Kwon et al. |
| 2020/0028102 A1 | 1/2020 | Kim et al. |
| 2020/0051964 A1 | 2/2020 | Jung et al. |
| 2020/0119290 A1 | 4/2020 | Shin |

FOREIGN PATENT DOCUMENTS

| | | |
|---|---|---|
| CN | 107731866 A | 2/2018 |
| CN | 107871761 A | 4/2018 |
| CN | 108183126 A | 6/2018 |
| EP | 3104370 A1 | 12/2016 |
| EP | 3232743 A1 | 10/2017 |
| JP | 2015144254 A | 8/2015 |
| KR | 10-2014-0039572 A | 4/2014 |
| KR | 20140121325 A | 10/2014 |
| KR | 10-2015-0069079 A | 6/2015 |
| KR | 10-20150061159 A | 6/2015 |
| KR | 10-2016-0020034 A | 2/2016 |
| KR | 10-1647023 B1 | 8/2016 |
| KR | 10-2017-0034522 A | 3/2017 |
| KR | 10-2017-0061313 A | 6/2017 |
| KR | 20170088013 A | 8/2017 |
| KR | 10-2017-0110209 A | 10/2017 |
| KR | 10-2017-0111634 A | 10/2017 |
| KR | 10-2017-0112151 A | 10/2017 |
| KR | 101810050 B1 | 12/2017 |
| KR | 20180011812 A | 2/2018 |
| TW | 200424981 A | 11/2004 |

\* cited by examiner

STRETCHABLE DISPLAY PANEL AND DEVICE AND MANUFACTURING METHOD OF THE SAME

CROSS-REFERENCE TO RELATED APPLICATIONS

This application is a continuation of U.S. application Ser. No. 16/590,083, filed Oct. 1, 2019, which claims the priority of Korean Patent Application No. KR 10-2018-0119622, filed Oct. 8, 2018, in the Korean Intellectual Property Office, the disclosure of which is incorporated herein by reference.

BACKGROUND

Technical Field

The present disclosure relates to a stretchable display panel and device and a manufacturing method thereof and, in particular, a stretchable display panel and device that may reduce damage to wires even though it is bent or stretched, and a method of manufacturing the stretchable display device.

Description of the Related Art

An Organic Light Emitting Display (OLED) that generates light by itself, a Liquid Crystal Display (LCD) that requires separate light sources, etc., are used as the display devices of a computer monitor, a TV, a mobile phone, and the like.

Display devices are being applied to more and more various fields including not only a computer monitor and a TV, but personal mobile devices, a display device having a wide active area and reduced volume and weight is being studied.

Recently, a stretchable display device manufactured to be able to stretch/contract in a specific direction and change into various shapes by forming a display unit, lines, etc., on a flexible substrate such as plastic that is a flexible material has been spotlighted as a next generation display device.

BRIEF SUMMARY

An object of the present disclosure is to provide a stretchable display device that may be bent or stretched without damaging display elements disposed on a plurality of individual substrates on which a plurality of pixels is defined because a lower substrate disposed under the plurality of individual substrates has a modulus that is different for each area, and a method of manufacturing the stretchable display device.

Another object of the present disclosure is to provide a stretchable display device that may suppress damage to connecting lines due to a step because the connecting lines are disposed flat without a step under a lower substrate and the connecting lines and pads are electrically connected through contact holes formed at individual substrates and an insulating layer disposed under display elements, and a method of manufacturing the stretchable display device.

Objects of the present disclosure are not limited to the above-mentioned objects, and other objects, which are not mentioned above, can be clearly understood by those skilled in the art from the following descriptions.

According to an aspect of the present disclosure, there is provided a stretchable display panel, comprising: a lower substrate having an active area and a non-active area surrounding the active area; a plurality of individual substrates disposed on the lower substrate and located in the active area; a plurality of pixels disposed on the plurality of individual substrates; and a connection line disposed between the plurality of individual substrates and the lower substrate, wherein the elastic modulus of the plurality of individual substrates is higher than that of at least one part of the lower substrate, and wherein the connecting line extends to the bottom surface of the individual substrates, such that the connection line has the same height for its entire length above the lower substrate and therefore electrically connects a pad disposed on the individual substrates without a step in the top surface of the connecting line.

According to another aspect of the present disclosure, there is provided a stretchable display device comprising the above stretchable display panel.

According to another aspect of the present disclosure, there is provided a method of manufacturing a stretchable display device, the method comprising: disposing a plurality of individual substrates on a temporary substrate; forming a transistor and a emitting element on one surface of the plurality of individual substrates; disposing a protective film on the emitting element and removing the temporary substrate; forming a first connecting line and a second connecting line, which are respectively electrically connected with a gate pad and a data pad, on another surface of the plurality of individual substrates; and forming a lower substrate including a first lower pattern overlapped with the plurality of individual substrates and a second lower pattern surrounding the first lower pattern, wherein the forming a first connecting line and a second connecting line is forming a connecting line having a flat surface for its entire length, and therefore being without a step.

Other detailed matters of the exemplary embodiments are included in the detailed description and the drawings.

The present disclosure has an effect that efficiently uses the area of a stretchable display device and increases an aperture ratio by disposing additional subpixels in the other area excepting a light emitting area and a line area on a lower substrate.

The present disclosure has an effect to be more easily bent or stretched by disposing a plurality of rigid patterns and flexible patterns excepting the plurality of rigid patterns under a plurality of individual substrates. The present disclosure has an effect to minimize damage to the connecting line due to a step generated in the connecting line.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
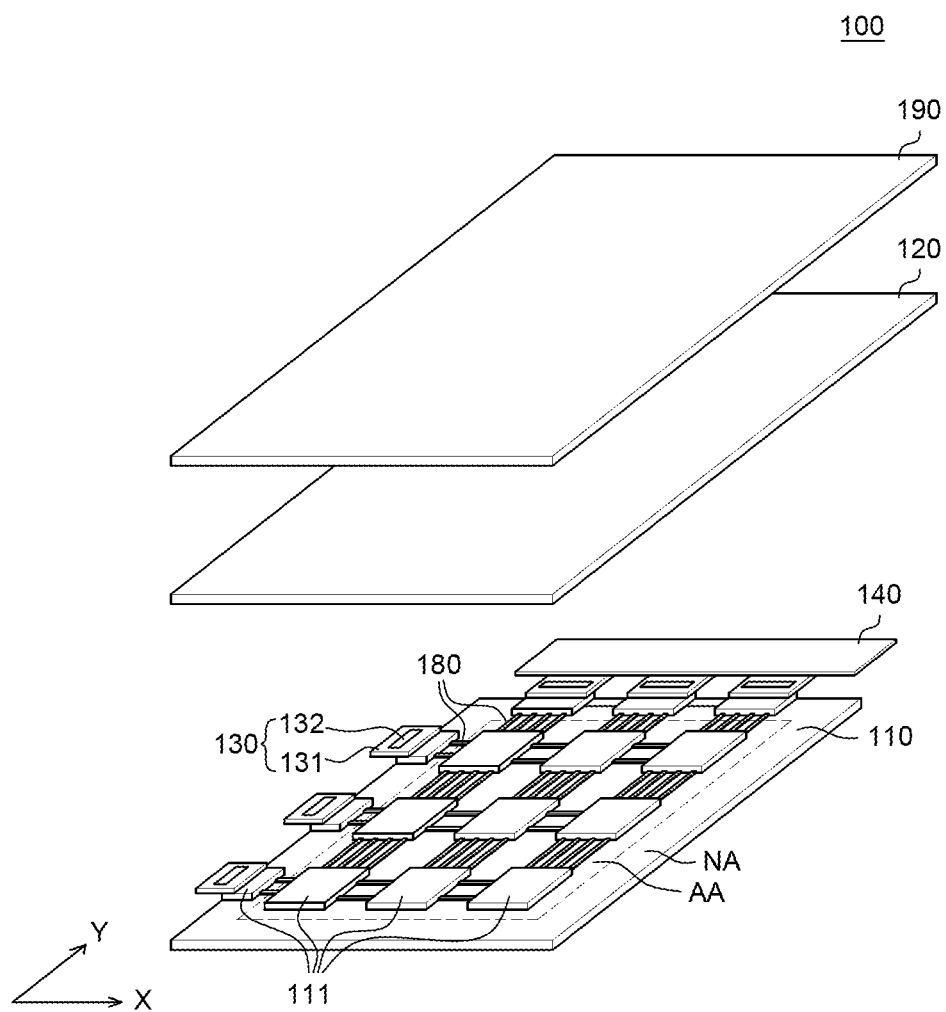
FIG. 1 is an exploded perspective view of a stretchable display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a stretchable display device and manufacturing method of the same according to exemplary embodiments of the present disclosure will be described in detail with reference to accompanying drawings.

Stretchable Display Device

A stretchable display device may be referred to as a display device that may display images even if it is bent or stretched. A stretchable display device may have high flexibility, as compared with common display devices. Accordingly, the shape of the stretchable display device may be freely changed in accordance with operation by a user such as bending or stretching the stretchable display device. For example, when a user holds and pulls an end of a stretchable display device, the stretchable display device may be stretched by the force of the user. Alternatively, when a user puts a stretchable display device on an uneven wall, the stretchable display device may be bent into the surface shape of the wall. When the force applied by a user is removed, a stretchable display device may return into the initial shape.

FIG. 1 is an exploded perspective view of a stretchable display device according to an embodiment of the present disclosure. Referring to FIG. 1, a stretchable display device 100 includes a lower substrate 110, a plurality of individual substrates 111, connecting lines 180, Chip on Films (COF) 130, a printed circuit board 140, an upper substrate 120, and a polarizing layer 190. An adhesive layer for bonding the lower substrate 110 and the upper substrate 120 is not shown in FIG. 1 for the convenience of description.

The lower substrate 110 is a substrate for supporting and protecting various components of the stretchable display device 100. The lower substrate 110, which is a flexible substrate, may be made of a bendable or stretchable insulating material. For example, the lower substrate 110 may be made of silicon rubber such as polymethylsiloxane (PDMS) or an elastomer such as polyurethane (PU), so it may have flexibility. The material of the lower substrate 110, however, is not limited thereto.

The lower substrate 110, which is a flexible substrate, may reversibly expand and contract. The lower substrate 110 may have an elastic modulus of several to hundreds of MPa and a tensile fracture rate of 100% or more. The elastic modulus may be referred to herein either as the elastic modulus or in some instances, as the modulus. The thickness of the lower substrate 110 may be 10 μm to 1 mm, but is not limited thereto.

The lower substrate 110 is a flexible substrate and may further include a rigid pattern made of a material that is more rigid than a flexible substrate. That is, the lower substrate 110 may include a first lower pattern and a second lower pattern that are different in modulus. For example, the first lower pattern may be higher in modulus than the second lower pattern and the second lower pattern may be lower in modulus than the first lower pattern. The lower substrate 110 will be described below in more detail with reference to FIG. 3.

The lower substrate 110 may have an active area AA and a non-active area NA surrounding the active area AA.

The active area AA is an area where images are displayed on the stretchable display device 100, and light emitting elements and various driving elements for driving the light emitting elements are disposed in the active area AA. The active area AA includes a plurality of pixels including a plurality of subpixels. The plurality of pixels is disposed in the active area AA and includes a plurality of subpixels. The plurality of subpixels each may be connected with various lines. For example, the plurality of subpixels each may be connected with various lines such as a gate line, a data line, a high-potential power line, a low-potential power line, and a reference voltage line.

The non-active area NA is an area adjacent to the active area AA. The non-active area NA is an area disposed adjacent to the active area AA and surrounding the active area AA. The non-active area NA is an area where an image is not displayed, and lines and circuits may be disposed in the non-active area NA. For example, a plurality of pads may be disposed in the non-active area NA and the pads may be respectively connected with the plurality of subpixels in the active area AA.

A plurality of individual substrates 111 is disposed in the area overlapped with the first lower pattern of the lower substrate 110. The plurality of individual substrates 111, which are rigid substrates, is spaced apart from each other. The plurality of individual substrates 111 may be more rigid than the second lower pattern of the lower substrate 110.

The plurality of individual substrates 111, which is a plurality of rigid substrates, may be made of plastic having flexibility and, for example, may be made of Polyimide (PI), polyacrylate, or polyacetate.

The modulus of the plurality of individual substrates 111 may be higher than that of the second lower pattern of the lower substrate 110. The modulus is an elastic modulus showing the ratio of deformation of a substrate to stress applied to the substrate, and when the modulus is relatively high, the strength may be relatively high. Accordingly, the plurality of individual substrates 111 may be the plurality of rigid substrates that is more rigid than the lower substrate 110. The modulus of the plurality of individual substrates 111 may be a thousand times larger than that of the lower substrate 110, but is not limited thereto.

Connecting lines 180 are disposed under the plurality of individual substrates 111 and on the lower substrate 110. That is, the connecting lines 180 may be disposed between the plurality of individual substrates 111 and the lower substrate 110. The connecting lines 180 may be electrically connected with pixels through contact holes formed at the plurality of individual substrates 111 and insulating layers under the light emitting elements disposed on the individual substrates 111. The connecting lines 180 will be described below in more detail with reference to FIGS. 2 and 3.

The COFs 130, which are films having various components on flexible base films 131, are components for supplying signals to the plurality of subpixels in the active area AA. The COFs 130 may be bonded to the plurality of pads disposed in the non-active area NA and supply a power voltage, a data voltage, a gate voltage, etc., to the plurality of subpixels in the active area AA through the pads. The COFs 130 each include a base film 131 and a driving IC 132 and may include various other components.

The base films 131 are layers supporting the driving ICs 132 of the COFs 130. The base films 131 may be made of an insulating material, for example, an insulating material having flexibility.

The driving ICs 132 are components that process data for displaying images and driving signals for processing the data. Although the driving ICs 132 are mounted in the type of the COF 130 in FIG. 1, the driving ICs 132 are not limited thereto and may be mounted in the type of Chip On Glass (COG) or Tape Carrier Package (TCP).

Controllers such as an IC chip and a circuit may be mounted on the printed circuit board 140. A memory, a processor, etc., may also be mounted on the printed circuit board 140. The printed circuit board 140 transmits signals for driving the pixels from the controller to the pixels.

The printed circuit board 140 is connected with the COFs 130, so they may be electrically connected with the plurality of subpixels on the plurality of individual substrates 111.

The upper substrate 120 is a substrate overlapped over the lower substrate 110 to protect various components of the stretchable display device 100. The upper substrate 120, which is a flexible substrate, may be made of a bendable or stretchable insulating material. For example, the upper substrate 120 may be made of a flexible material and may be made of the same material the lower substrate 110, but is not limited thereto.

The polarizing layer 190, which is a component reducing external light reflection by the stretchable display device 100, may be disposed on the upper substrate 120 so as to overlap the upper substrate 120. However, the polarizing layer 190 is not limited thereto and, may be disposed under the upper substrate 120, or may not be provided, depending on the configuration of the stretchable display device 100.

Figure 2:
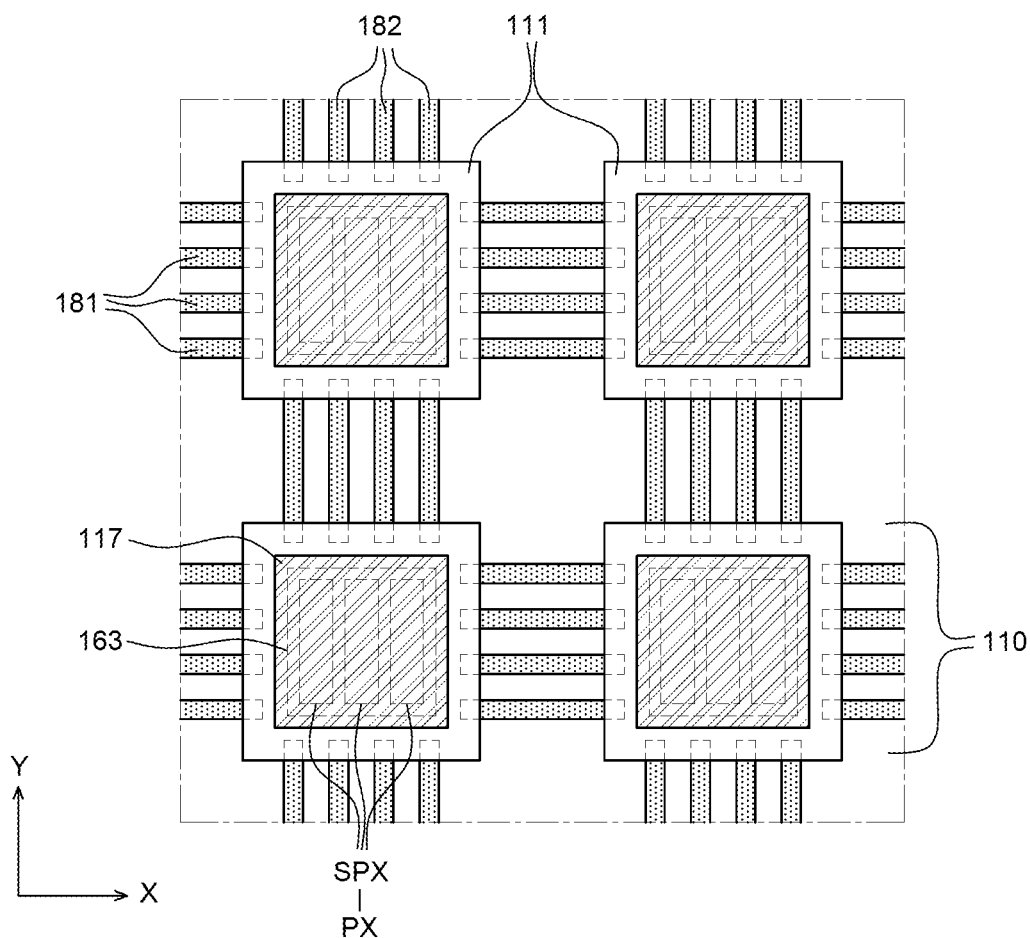
FIG. 2 is an enlarged plan view of the stretchable display device according to an embodiment of the present disclosure.
Figure 3:
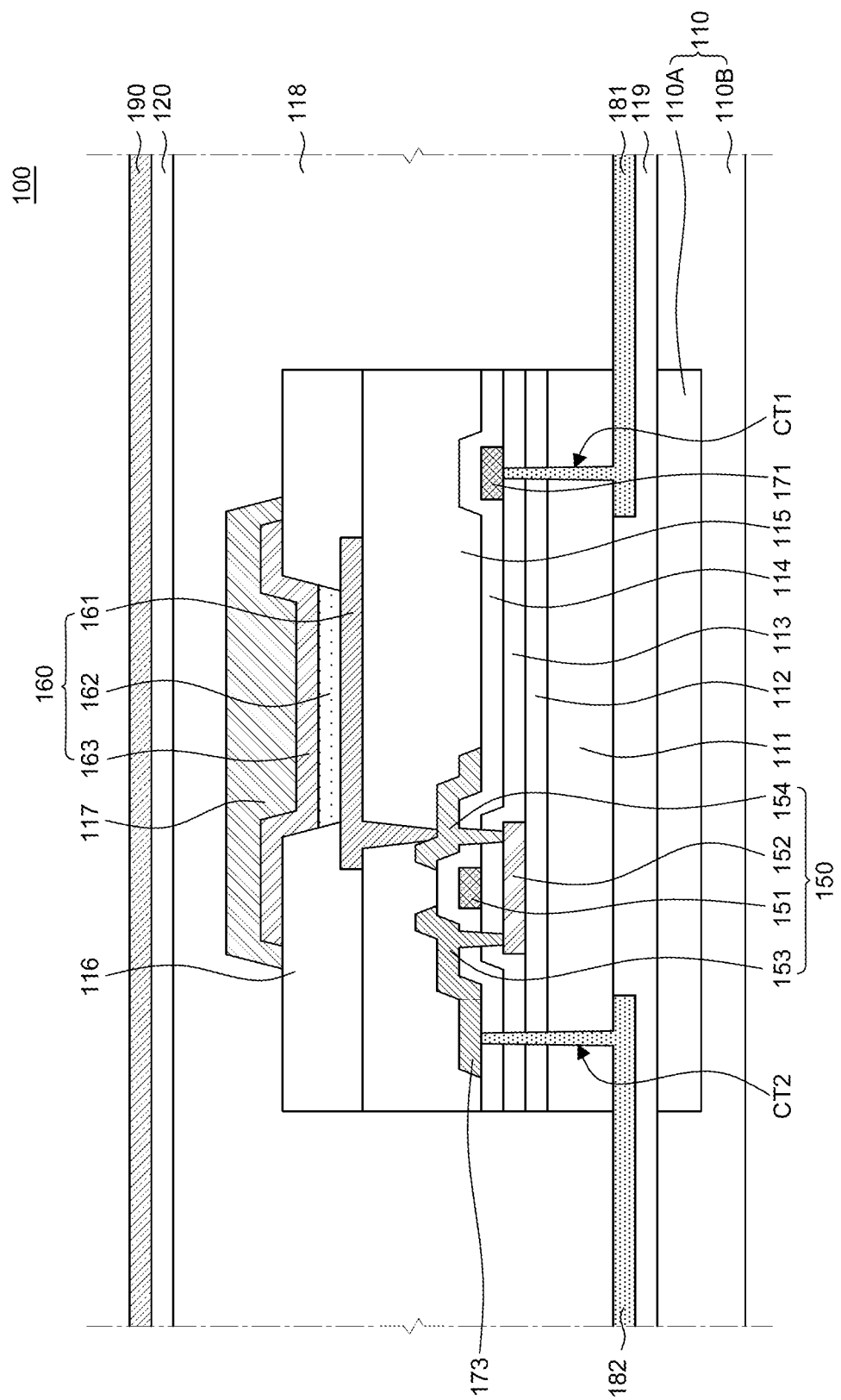
FIG. 3 is a schematic cross-sectional view showing one subpixel shown in FIG. 1.

FIGS. 2 and 3 are referred to hereafter to describe in more detail the stretchable display device 100 according to an embodiment of the present disclosure.

Planar & Cross-Sectional Structure

FIG. 2 is an enlarged plan view of the stretchable display device according to an embodiment of the present disclosure. FIG. 3 is a schematic cross-sectional view showing one subpixel shown in FIG. 1. Pixels and corresponding subpixels having the same connecting lines and characteristics are positioned on each side of the pixel shown in FIG. 3, the pattern repeating itself numerous times on the display panel. Only a single pixel is shown for ease of reference. FIG. 1 is referred to for the convenience of description.

Referring to FIGS. 2 and 3, the lower substrate 110 supporting components of the stretchable display device 100 is disposed. In more detail, referring to FIG. 3, the lower substrate 110 includes a plurality of first lower patterns 110A and second lower patterns 110B.

The plurality of first lower patterns 110A is disposed in the areas overlapped with a plurality of individual substrates 111 on the lower substrate 110. The plurality of first lower patterns 110A may be disposed under the plurality of individual substrates 111 with the top surfaces bonded to the bottom surfaces of the plurality of individual substrates 111 by a lower adhesive layer 119.

The second lower patterns 110B are disposed in areas excepting the plurality of first lower patterns 110A on the lower substrate 110. The second lower patterns 110B may be disposed to surround the sides and the bottom surface of the plurality of first lower pattern 110A. However, the second lower patterns 110B are not limited thereto and may be disposed in the same plane as the first lower patterns 110A. The second lower patterns 110B are disposed under the connecting lines 180 and a first adhesive layer 119 with the top surfaces in contact with the bottom surfaces of the connecting lines 180 and the bottom surface of the first adhesive layer 119.

The first lower patterns 110A may be larger in modulus than the second lower patterns 110B. Accordingly, the plurality of first lower patterns 110A may be a plurality of lower rigid patterns that is more rigid than the second lower patterns 110B, and the second lower patterns 110B may be flexible lower patterns that are more flexible than the plurality of first lower patterns 110A. The modulus of the plurality of first lower patterns 110A may be a thousand times larger than those of the second lower patterns 110B, but is not limited thereto.

The plurality of first lower patterns 110A may be made of the same material as the plurality of individual substrates 111, may be made of plastic having flexibility, and for example, may be made of Polyimide (PI), polyacrylate, or polyacetate. However, the plurality of first lower patterns 110A is not limited thereto and may be made of a material having a modulus that is the same as or smaller than those of the plurality of individual substrates 111.

The second lower patterns 110B, which are flexible lower patterns, may reversely expand and contract and may have an elastic modulus of several to hundreds of MPa and a tensile fracture rate of 100% or more. Accordingly, the second lower patterns 110B may be made of a bendable or stretchable insulating material and may be made of silicon rubber such as Polydimethylsiloxane (PDMS) or an elastomer such as Polyurethane (PU), but are not limited thereto.

Referring to FIGS. 2 and 3, the plurality of individual substrates 111 is disposed on the lower substrate 110. The plurality of individual substrates 111 is disposed in areas overlapped with the first lower patterns 110A on the lower substrate 110. The plurality of individual substrates 111 is spaced apart from each other on the lower substrate 110. The distance between the plurality of individual substrates 111 and the distance between the plurality of first lower patterns 110A of the lower substrate 110 may be the same. For example, the plurality of individual substrates 111 is spaced a predetermined distance apart from each other, so they may be disposed in a matrix shape on the lower substrate 110, as shown in FIGS. 1 and 2, but is not limited thereto.

A contact hole CT for electrically connecting the connecting lines 180 disposed under the plurality of individual substrates 111, and gate pads 171 and data pads 173 disposed on the plurality of individual substrates 111 may be formed at the plurality of individual substrates 111.

Referring to FIG. 3, a buffer layer 112 is disposed on the plurality of individual substrates 111. The buffer layer 112 is formed on the plurality of individual substrates 111 to protect various components of the stretchable display device 100 against permeation of water ($H_2O$) and oxygen (O2) from the outside the lower substrate 110 and the plurality of individual substrates 111. The buffer layer 112 may be made of an insulating material, and for example, may be a single inorganic layer or a multi-inorganic layer made of graphite, a silicon nitride (SiNx), a silicon oxide (SiOx), or silicon oxynitride (SiON). However, the buffer layer 112 may not be provided, depending on the structure of characteristics of the stretchable display device 100.

The buffer layer 112 may be formed only in the areas overlapped with the plurality of individual substrates 111. As described above, since the buffer layers 112 may be made of an inorganic material, they may be easily damaged, such as cracking, when the stretchable display device 100 is stretched. Accordingly, the buffer layer 112 is patterned in the shape of the plurality of individual substrates 111 without being formed in the areas between the plurality of individual substrates 111, whereby it may be formed only on the plurality of individual substrates 111. Therefore, since the buffer layer 112 is formed only in the areas overlapped with the plurality of individual substrates 111 that are rigid substrates, it is possible to reduce damage to the buffer layer 112 even though the stretchable display device 100 according to an embodiment of the present disclosure is deformed, such as bending or stretching.

A contact hole CT for electrically connecting the connecting lines 180 disposed under the plurality of individual substrates 111, and the gate pads 171 and the data pads 173 disposed on the plurality of individual substrates 111 may be formed at the buffer layers 112. The contact holes CT formed at the buffer layers 112 may extend from the contact holes CT formed at the plurality of individual substrates 111.

Referring to FIG. 3, a transistor 150 including a gate electrode 151, an active layer 152, a source electrode 153, and a drain electrode 154 is formed on the buffer layer 112. For example, the active layer 152 is formed on the buffer layer 112, and a gate insulating layer 113 for insulating the active layer 152 and the gate electrode 151 from each other is formed on the active layer 152. An inter-layer insulating layer 114 is formed to insulate the gate electrode 151, the source electrode 153, and the drain electrode 154 from each other, and the source electrode 153 and the drain electrode 154 that are in contact with the active layer 152 are formed on the inter-layer insulating layer 114.

The gate insulating layer 113 and the inter-layer insulating layer 114 may be formed only in the areas overlapped with the plurality of individual substrates 111 by patterning. The gate insulating layer 113 and the inter-layer insulating layer 114 may also be made of an inorganic material, similar to the buffer layer 112, so they may be easily damaged such as cracking when the stretchable display device 100 is stretched. Accordingly, the gate insulating layer 113 and the inter-layer insulating layer 114 are patterned in the shape of the plurality of individual substrates 111 without being formed in the areas between the plurality of individual substrates 111, whereby they may be formed only on the plurality of individual substrates 111.

A contact hole CT for electrically connecting the connecting lines 180 disposed under the plurality of individual substrates 111, and the gate pads 171 and the data pads 173 may be formed at the gate insulating layer 113 and the inter-layer insulating layer 114. The contact holes CT formed at the gate insulating layer 113 and the inter-layer insulating layer 114 may extend from the contact holes CT formed at the plurality of individual substrates 111 and the buffer layer 112.

Only a driving transistor of various transistors that may be included in the stretchable display device 100 is shown in FIG. 3 for the convenience of description, but a switching transistor, a capacitor, etc., may be included in the display device. Further, although the transistor 150 is described as having a coplanar structure in the present disclosure, various transistors, for example, having a staggered structure may be used.

Referring to FIG. 3, a gate pad 171 is disposed on the gate insulating layer 113. The gate pad 171 is a pad for transmitting a gate signal to a plurality of subpixels SPX. The gate pad 171 may be disposed on the same layer as the gate electrode 151 and made of the same material as the gate electrode 151, but is not limited thereto. That is, the gate pad 171 may be made of the same material as at least one of conductive patterns of the transistor 150 and the organic light emitting element 160 disposed on the individual substrate 111. For example, the gate pad 171 may be made of the same material as one of the gate electrode 151, the source electrode 153, the drain electrode 154, and the anode 161 on the same layer. Alternatively, the gate pad 171 may be made of the same material as two of the gate electrode 151, the source electrode 153, the drain electrode 154, and the anode 161 on the same layer. The gate pad 171 may be electrically connected with a first connecting line 181 that functions as a gate line disposed under the individual substrate 111 through contact holes CT formed at the individual substrate 111, the buffer layer 112, and the gate insulating layer 113.

Referring to FIG. 3, a data pad 173 is disposed on the inter-layer insulating layer 114. The data pad 173 may be electrically connected with a second connecting line 182 that functions as a data line, and may transmit a data signal from the second connecting line 182 to a plurality of subpixels SPX. The data pad 173 may be defined as an area where the source electrode 153 of the transistor 150 extends, but is not limited thereto. That is, the data pad 173 may be made of the same material as at least one of conductive patterns of the transistor 150 and the organic light emitting element 160 disposed on the individual substrate 111. For example, the data pad 173 may be made of the same material as one of the gate electrode 151, the source electrode 153, the drain electrode 154, and the anode 161 on the same layer. Alternatively, the data pad 173 may be made of the same material as two of the gate electrode 151, the source electrode 153, the drain electrode 154, and the anode 161 on the same layer. The data pad 173 may be electrically connected with a second connecting line 182 that functions as a data line disposed under the individual substrate 111 through contact holes CT formed at the individual substrate 111, the buffer layer 112, the gate insulating layer 113, and the inter-layer insulating layer 114.

Referring to FIG. 3, a planarization layer 115 is formed on the transistor 150 and the inter-layer insulating layer 114. The planarization layer 115 planarizes the top surface of the transistor 150. The planarization layer 115 may be composed of a single layer or a plurality of layers and may be made of an organic material. For example, the planarization layer 115 may be made of an acrylic-based organic material, but is not limited thereto. The planarization layer 115 may have a contact hole for electrically connecting the transistor 150 and the anode 161.

In some embodiments, a passivation layer may be formed between the transistor 150 and the planarization layer 115. That is, a passivation layer covering the transistor 150 may be formed to protect the transistor 150 from permeation of water and oxygen. The passivation layer may be made of an inorganic material and may be composed of a single layer or a plurality of layers, but is not limited thereto.

Referring to FIG. 3, an organic light emitting element 160 is disposed on the planarization layer 115. The organic light emitting elements 160 are components disposed to correspond to a plurality of subpixel SPX, respectively, and emit light having a specific wavelength band. That is, the organic light emitting element 160 may be a blue organic light emitting element that emits blue light, a red organic light emitting element that emits red light, a green organic light emitting element that emits green light, or a white organic light emitting element that emits white light, but is not limited thereto. When the organic light emitting element 160 is a white organic light emitting element, the stretchable display device 100 may further include a color filter.

The organic light emitting element 160 includes an anode 161, an organic light emitting layer 162, and a cathode 163. In detail, the anode 161 is disposed on the planarization layer 115. The anode 161 is an electrode for supplying holes to the organic light emitting layer 162. The anode 161 may be made of a transparent conductive material with a high work function. The transparent conductive material may include an Indium Tin Oxide (ITO), an Indium Zinc Oxide (IZO), or an Indium Tin Zinc Oxide (ITZO). When the stretchable display device 100 is implemented in a top emission type, the anode 161 may further include a reflective plate.

The anodes 161 are spaced apart from each other respectively for subpixels SPX and electrically connected with the transistor 150 through contact holes of the polarization layer 115. For example, although the anode 161 is electrically connected with the drain electrode 154 of the transistor 150 in FIG. 3, it may be electrically connected with the source electrode 153.

A bank 116 is formed on the anode 161 and the planarization layer 115. The bank 116 is a component separating adjacent subpixels SPX. The bank 116 is disposed to cover at least partially both sides of adjacent anodes 161, thereby partially exposing the top surfaces of the anode 161. The bank 116 may reduce the problem that an unexpected subpixel SPX emits light or colors are mixed by light emitted in the lateral direction of the anode 161 due to concentration of a current on the edge of the anode 161. The bank 116 may be made of acrylic-based resin, Benzocyclobutene (BCB)-based resin, or polyimide, but is not limited thereto.

The organic light emitting layer 162 is disposed on the anode 161. The organic light emitting layer 162 emits light. The organic light emitting layer 162 may include a luminescent material, and the luminescent material may include a phosphorous material or a fluorescent material, but is not limited thereto.

The organic light emitting layer 162 may be composed of one light emitting layer. Alternatively, the organic light emitting layer 162 may have a stacked structure in which a plurality of light emitting layers is stacked with charge generation layers therebetween. The organic light emitting layer 162 may further include at least one organic layer of a hole transporting layer, an electron transporting layer, a hole blocking layer, an electrode blocking layer, a hole injection layer, and an electron injection layer.

Referring to FIGS. 2 and 3, the cathode 163 is disposed on the organic light emitting layer 162. The cathode 163 supplies electrons to the organic light emitting layer 162. The cathode 163 may be made of Indium Tin Oxide (ITO)-based, Indium Tin Zinc Oxide (ITZO)-based, Zinc Oxide (ZnO)-based, or Tin Oxide (TO)-based transparent conductive oxides or a Ytterbium (Yb) alloy. Alternatively, the cathode 163 may be made of metal.

The cathodes 163 may be patterned to respectively overlap the plurality of individual substrates 111. That is, the cathodes 163 may be disposed not in the areas between the plurality of individual substrates 111, but only in the areas overlapped with the plurality of individual substrates 111. Since the cathodes 163 are made of a transparent conductive oxide or metal, when the cathodes 163 are formed even in the areas between the plurality of individual substrates 111, the cathodes 163 may be damaged when the stretchable display device 100 is stretched/contracted. Accordingly, the cathodes 163 may be formed to respectively correspond to the plurality of individual substrates 111. Referring to FIGS. 2 and 3, the cathodes 163 may have an area not overlapped with the area where a connection line 180 is disposed, of the areas overlapped with the plurality of individual substrates 111.

Referring to FIGS. 2 and 3, an encapsulation layer 117 is disposed on the organic light emitting element 160. The encapsulation layer 117 may seal the organic light emitting element 160 by covering the organic light emitting element 160 in contact with a portion of the top surface of the bank 116. Accordingly, the encapsulation layer 117 protects the organic light emitting element 160 from water, air, or physical shock that may be applied from the outside.

The encapsulation layers 117 respectively cover the cathodes 163 patterned to respectively overlap the plurality of individual substrate 111 and may be formed on the plurality of individual substrates 111, respectively. That is, the encapsulation layers 117 are disposed to each cover one cathode 163 on one individual substrate 111 and the encapsulation layers 117 disposed on the plurality of individual substrates 111 may be spaced apart from each other.

The encapsulation layer 117 may be formed only in the areas overlapped with the plurality of individual substrates 111. As described above, since the encapsulation layers 117 may include an inorganic layer, they may be easily damaged, such as cracking, when the stretchable display device 100 is stretched. In particular, since the organic light emitting element 160 is vulnerable to water or oxygen, when the encapsulation layer 117 is damaged, reliability of the organic light emitting element 160 may be reduced. Therefore, since the encapsulation layer 117 is not formed in the areas between the plurality of individual substrates 111, damage to the encapsulation layer 117 may be minimized even though the stretchable display device 100 according to an embodiment of the present disclosure is deformed, such as, bending or stretching.

Compared with common flexible organic light emitting display devices of the related art, there is a difference in that the stretchable display device 100 according to an embodiment of the present disclosure has a structure in which the plurality of individual substrates 111 that is relatively rigid is disposed and spaced apart from each other on the lower substrate 110 that is relatively flexible. The cathodes 163 and the encapsulation layers 117 of the stretchable display device 100 are patterned to correspond to the plurality of individual substrates 111, respectively. That is, the stretchable display device 100 according to an embodiment of the present disclosure may have a structure that enables the stretchable display device 100 to be more easily deformed when a user stretches or bends the stretchable display device 100 and that may minimize damage to the components of the stretchable display device 100 when the stretchable display device 100 is deformed.

In the stretchable display device 100 according to an embodiment of the present disclosure, the lower substrate 110 includes the first lower patterns 110A overlapped with the plurality of individual substrates 111 and the second lower patterns 110B excepting the plurality of first lower patterns 110A. Further, the plurality of first lower patterns 110A is larger in modulus than the second lower patterns 110B. When the stretchable display device 100 is deformed such as bending or stretching, the plurality of first lower patterns 110A disposed under the plurality of individual substrates 111 may support the plurality of individual substrates 111 as rigid lower patterns. Accordingly, various elements disposed on the plurality of individual substrates 111 may be supported together with the plurality of individual substrates 111 by the plurality of first lower patterns 110A and damage to the elements due to deformation of the stretchable display device 100 may be reduced.

Further, when the stretchable display device 100 is deformed such as bending or stretching, the plurality of first lower patterns 110A is made of the same material as the plurality of individual substrates 111 and has a modulus higher than the second lower patterns 110B. Accordingly, the plurality of first lower patterns 110A is stretched more than the plurality of individual substrates 111 without deformation, and the plurality of first lower patterns 110A and the plurality of individual substrates 111 may keep firmly bonded to each other. Therefore, since the plurality of first lower patterns 110A and the plurality of individual substrates 111 overlap each other in the stretchable display device 100 according to an embodiment of the present disclosure, the areas where the pixels are disposed may be more rigid. Accordingly, defect of the stretchable display device 100 may be reduced even if the stretchable display device 100 is continuously deformed such as bending or stretching.

Since the second lower patterns 110B not overlapped with the plurality of individual substrates 111 are more flexible than the plurality of first lower patterns 110A, the areas where the second lower patterns 110B are disposed between the plurality of individual substrates 111 may be freely bent or stretched. Accordingly, the connecting lines 180 overlapped with the second lower patterns 110B also may be freely bent or stretched. Therefore, the stretchable display device 100 according to an embodiment of the present disclosure may be more easily deformed such as bending or stretching. The present disclosure is not limited thereto. The modulus of the individual substrates may be higher than that of at least one part of the lower substrate as required. For example, in the case of only a predetermined area of the stretchable display device is stretched or the stretchable display device is only stretched in a predetermined direction, the modulus of the individual substrates may be configured to be higher than that of a part of the lower substrate corresponding to the predetermined area or the predetermined direction.

Connecting Line Composed of Base Polymer & Conductive Particle

The connecting lines 180 are disposed between the plurality of individual substrates 111 and the lower substrate 110. In more detail, the connecting lines 180 may be disposed with the top surfaces in contact with portions of some lower areas of the plurality of individual substrates 111 and the bottom surface of the upper adhesive layer 118 bonding the lower substrate 110 and the upper substrate 120. However, when the upper substrate 120 is formed by coating, unlike that shown in FIG. 3, the upper substrate 120 may be disposed without using a separate adhesive layer. Accordingly, the connecting lines 180 may be disposed with the top surfaces in contact with some lower areas of the plurality of individual substrates 111 and the bottom surface of the upper substrate 120. Further, the connecting lines 180 may be disposed with the bottom surfaces extending from some areas of the first lower patterns 110A of the lower substrate 110 to the areas of the second lower patterns 110B. The some areas of the first lower patterns 110A may be areas corresponding to the contact holes CT formed at the individual substrates 111.

The connecting lines 180 may be electrically connected with the pads 171 and 173 disposed on the individual substrates 111 through the contact holes CT formed at insulating layers under the pads, which should be electrically connected with the connecting lines 180 of the components constituting the individual substrates 111 and the light emitting element, that is, the gate pads 171 and the data pad 173, and the individual substrates 111.

The connecting lines 180 include first connecting lines 181 extending in an X-axial direction and second connecting lines 182 extending in a Y-axial direction. The first connecting line 181 is electrically connected with the gate pads 171 disposed on the individual substrates 111 through first contact hole CT1. The second connecting line 182 is electrically connected with the data pads 173 disposed on the individual substrates 111 through second contact holes CT2.

In common display devices, various lines such as a plurality of gate lines and a plurality of data lines are extended and disposed between a plurality of subpixels, and a plurality of subpixels is connected to one signal line. Accordingly, in common display devices, various lines such a gate line, a data line, a high-potential power line, and a reference voltage line extend from a side to the other side of the display devices on a substrate without disconnection.

Unlikely, in the stretchable display device 100 according to an embodiment of the present disclosure, various lines such as gate lines, data lines, high-potential power lines, and reference voltage lines, which are made of metal, are disposed on the plurality of individual substrates 111. That is, in the stretchable display device 100 according to an embodiment of the present disclosure, various lines made of metal may be disposed only on the plurality of individual substrates 111 not in contact with the lower substrate 110. Accordingly, various lines may be patterned to correspond to the plurality of individual substrates 111 and discontinuously disposed.

In the stretchable display device 100 according to an embodiment of the present disclosure, the pads 171 and 173 on two adjacent individual substrates 111 may be connected by a connecting line 180 to connect the discontinuous lines. That is, a connecting line 180 electrically connects the pads 171 and 173 on two adjacent individual substrates 111. Accordingly, the stretchable display device 100 according to an embodiment of the present disclosure includes a plurality of connecting lines 180 to electrically connect various lines such as gate lines, data lines, high-potential power lines, and reference voltage lines between the plurality of individual substrates 111. For example, gate lines may be disposed on a plurality of individual substrates 111 disposed adjacent to each other in the X-axial direction, and the gate pad 171 may be disposed at both ends of the gate lines. The plurality of gate pads 171 on the plurality of individual substrates 111 disposed adjacent to each other in the X-axial direction may be connected to each other by a connecting line 180 functioning as a gate line. Accordingly, the gate line disposed on the plurality of individual substrates 111 and the connecting line 180 disposed on the lower substrate 110 may function as one gate line. All various lines that may be included in the stretchable display device 100, such as the data lines, high-potential power lines, and reference voltage lines, also each may function as one line by a connection line 180, as described above.

Referring to FIG. 2, a first connecting line 181 may connect the pads on two parallel individual substrates 111 of the pads of a plurality of individual substrates 111 disposed adjacent to each other in the X-axial direction. The first connecting line 181 may function as a gate line or a low-potential power line, but is not limited thereto. For example, the first connecting line 181 may function as a gate line and may electrically connect the gate pads 171 on two individual substrates 111 disposed in parallel in the X-axial direction through the first contact holes CT1 formed at the gate insulating layer 113, the buffer layer 112, and the individual substrates 111 disposed under the gate pads 171. Accordingly, as described above, the gate pads 171 on a plurality of individual substrates 111 disposed in the X-axial direction may be connected by first connecting lines 181 that function as gate lines, and one gate signal may be transmitted.

Referring to FIG. 2, a second connecting line 182 may connect the pads on two parallel individual substrates 111 of the pads of a plurality of individual substrates 111 disposed adjacent to each other in the Y-axial direction. The second connecting line 182 may function as a data line, a high-potential power line, or a reference voltage line, but is not limited thereto. For example, the second connecting line 182 may function as a data line and may electrically connect the data pads 173 on two individual substrates 111 disposed in parallel in the Y-axial direction through the second contact holes CT2 formed at the inter-layer insulating layer 114, the gate insulating layer 113, the buffer layer 112, and the individual substrates 111. Accordingly, as described above, the data pads 173 on a plurality of individual substrates 111 disposed in the Y-axial direction may be connected by the plurality of second connecting lines 182 that function as data lines, and one data signal may be transmitted.

In common stretchable display devices, connecting lines extend downward from above by forming contact holes at a planarization layer and a bank on a gate pad and a data pad. However, in this case, the connecting lines extend up a lower substrate from above light emitting elements, that is, the bank, so a step of the connecting lines is increased. Accordingly, the connecting lines formed to extend downward from above by forming contact holes at a planarization layer and a bank on a gate pad and a data pad are easily damaged by the large step being present.

However, according to the stretchable display device 100 according to an embodiment of the present disclosure, the connecting lines 180 are disposed to extend from some area of the first lower pattern 110A of the lower substrate 110 to the area where the second lower pattern 110B is disposed. Further, contact holes CT are formed at the insulating layer 113, the buffer layer 112, and the individual substrate 111 under the gate pad 171 formed on the individual substrate 111, or contact holes are formed at the inter-layer insulating layer 114, the gate insulating layer 113, the buffer layer 112, and the individual substrate 111 under the data pad 173, and then the contact holes are filled with the same material as the connecting lines 180. Thereafter, the connecting lines 180 and the gate pad 171 or the data pad 173 are electrically connected. Accordingly, the step of the connecting lines 180 is reduced, whereby damage to the connecting lines 180 may be reduced.

Referring to FIG. 2, the connecting line 180 includes a base polymer and conductive particles. In detail, the first connecting line 181 includes a base polymer and conductive particles and the second line 182 includes a base polymer and conductive particles. The first connecting line 181 may extend to the top surface of the lower substrate 110 in contact with the lower portion of the individual substrate 111 and the lower portion of the adhesive layer 118.

The base polymer of the first connecting line 181 may be made of a bendable or stretchable insulating material similar to the lower substrate 110. The base polymer, for example, may include silicon rubber such as Polydimethylsiloxane (PDMS), an elastomer such as polyurethane (PU), Styrene Butadiene Styrene (SBS), etc., but is not limited thereto. Accordingly, when the stretchable display device 100 is bent or stretched, the base polymer may not be damaged. The base polymer may be formed by coating a material for the base polymer or applying the material using a slit to the top surface of the lower substrate 110 and the bottom surface of the individual substrate 111.

The conductive particles of the first connecting line 181 may be distributed by the base polymer. In detail, the first connecting line 181 may include conductive particles distributed with predetermined density in the base polymer. The first connecting line 181, for example, may be formed by uniformly stirring conductive particles in a base polymer and then coating and hardening the base polymer with the conductive particles distributed therein to the top surface of the lower substrate 110, and the bottom surface of the individual substrate 111, and the bottom surface of the adhesive layer 118, but is not limited thereto. The conductive particles may include at least one of silver (Ag), gold (Au), and carbon, but is not limited thereto.

The conductive particles distributed in the base polymer of the first connecting line 181 may form a conductive path electrically connecting the gate pads 171 disposed on adjacent individual substrates 111. Further, the conductive particles distributed in the base polymer of the first connecting line 181 may form a conductive path electrically connecting a gate pad 171 on the outermost individual substrate 111 of a plurality of individual substrates 111 to a pad disposed in the non-active area NA.

Referring to FIG. 2, the base polymer and the conductive particles distributed in the base polymer of the first connecting line 181 may connect straight the gate pads 171 disposed on adjacent individual substrates 111. To this end, base polymers may be formed in a straight shape connecting the plurality of individual substrates 111 in the manufacturing process. Accordingly, the conductive paths formed by the conductive particles distributed in the base polymers also may be straight. However, the shape and the process of forming the base polymer and the conductive particles of the first connecting line 181 may not be limited thereto.

Referring to FIG. 2, the second connecting line 182 may extend to the top surface of the second lower pattern 110B of the lower substrate 110 in contact with the bottom surface of the individual substrate 111 and the bottom surface of the upper adhesive layer 118.

The base polymer of the second connecting line 182 may be made of a bendable or stretchable insulating material similar to the lower substrate 110, and may be made of the same material as the base polymer of the first connecting line 181. The base polymer, for example, may include silicon rubber such as Polydimethylsiloxane (PDMS), an elastomer such as polyurethane (PU), Styrene Butadiene Styrene (SBS), etc., but is not limited thereto.

The conductive particles of the second connecting line 182 may be distributed by the base polymer. In detail, the second connecting line 182 may include conductive particles distributed with predetermined density in the base polymer. The conductive particles distributed at the upper portion and the lower portion in the base polymer of the second connecting line 182 may be substantially the same in density. The manufacturing process of the second connecting line 182 may be the same as that of the first connecting line 181 or may be simultaneously performed.

Referring to FIG. 2, the base polymer and the conductive particles distributed in the base polymer of the second connecting line 182 may connect straight the data pads 173 disposed on adjacent individual substrates 111. To this end, base polymers may be formed in a straight shape connecting the plurality of individual substrates 111 in the manufacturing process. Accordingly, the conductive paths formed by the conductive particles distributed in the base polymers also may be straight. However, the shape and the process of forming the base polymer and the conductive particles of the second connecting line 182 may not be limited thereto.

In some embodiments, the base polymer of the connecting line 180 may be formed as a single layer between adjacent individual substrates 111 on the lower substrate 110. In detail, a base polymer, unlike FIG. 2, may be disposed as a single layer between individual substrates 111, which are most adjacent to each other in the X-axial direction, in contact with the lower substrate 110. A base polymer may be formed to overlap all of a plurality of pads disposed in parallel at a side on one individual substrate 111. Conductive particles may be separately formed to form a plurality of conductive paths on a base polymer, which is disposed as one layer, and respectively correspond to a plurality of pads. Accordingly, conductive paths formed by conductive particles may connect straight the pads disposed on adjacent individual substrates 111. For example, conductive particles may be injected to form four conductive paths on a base polymer disposed as one layer between a plurality of individual substrates 111.

In some embodiments, the base polymers of the connecting lines 180 may be disposed in the entire area of the lower substrate 110. That is, the base polymers may be disposed in a single layer on the lower substrate 110. Conductive particles may form a conductive path connecting the pads on a plurality of adjacent individual substrates 111 in the base polymer.

When the base polymers are disposed in a single layer in the entire area on the lower substrate 110, there may be no separate process for patterning the base polymers. Accordingly, the process of manufacturing the base polymers and the connecting lines may be simplified, and the manufacturing costs and time may be reduced.

Since the base polymers are disposed in a single layer in the entire area on the lower substrate 110, the base polymers may more efficiently distribute the force that is applied when the stretchable display device 100 is bent or stretched.

Referring to FIG. 3, the upper substrate 120, the polarizing layer 190, and the adhesive layer 118 are disposed on the encapsulation layer 117 and the lower substrate 110.

The upper substrate 120 is a substrate supporting various components disposed under the upper substrate 120. The upper substrate 120, which is a flexible substrate, may be made of a bendable or stretchable insulating material. The upper substrate 120, which is a flexible substrate, may reversibly expand and contract. The upper substrate may have an elastic modulus of several to hundreds of MPa and a tensile fracture rate of 100% or more. The thickness of the upper substrate 120 may be 10 μm to 1 mm, but is not limited thereto.

The upper substrate 120 may be made of the same material as the lower substrate 110, for example, silicon rubber such as polyimethylsiloxane (PDMS) or an elastomer such as polyurethane (PU), so it may have flexibility. The material of the upper substrate 120, however, is not limited thereto.

Referring to FIG. 3, although the upper substrate 120 is composed of a single pattern, it may include a first upper pattern and a second upper pattern that are different in moduli, similar to the lower substrate 110. For example, if the upper substrate 120 has the first upper pattern and the second upper pattern, the first upper pattern may be disposed to correspond to the first lower pattern 110A of the lower substrate 110 and the second upper pattern may be disposed to correspond to the second lower pattern 110B of the lower substrate 110. Further, the first upper pattern may be made of a rigid material having a higher modulus than the second upper pattern, and the second upper pattern may be made of a flexible material having a lower modulus than the first upper pattern. The second upper pattern may be disposed to surround the first upper pattern.

The upper substrate 120 and the lower substrate 110 may be bonded through the upper adhesive layer 118 disposed under the upper substrate 120 by applying pressure to the upper substrate 120 and the lower substrate 110. However, the present disclosure is not limited thereto, and the upper adhesive layer 118 may not be provided, depending on embodiments. For example, the stretchable display device 100 may be manufactured by coating and then hardening the material for the upper substrate 120 without the upper adhesive layer 118.

The polarizing layer 190 is disposed on the upper substrate 120. The polarizing layer 190 may polarize light incident into the stretchable display device 100 from the outside. The polarized Light incident into the stretchable display device 100 through the polarizing layer 190 may be reflected in the stretchable display device 100, so the phase of the light may be changed. The light with the changed phase may not pass through the polarizing layer 190. Accordingly, the light incident in the stretchable display device 100 from the outside of the stretchable display device 100 is not discharged back to the outside of the stretchable display device 100, so the external light reflection of the stretchable display device 100 may be reduced.

Individual Stretching Characteristic by Plurality Of Individual Substrates

A stretchable display device needs an easily bending or stretching characteristic, so there have been attempts to use substrates that are flexible due to a small modulus. However, when a flexible material such as Polydimethylsiloxane (PDMS) having a small modulus is used as a lower substrate that is disposed in the process of manufacturing a light emitting element, the substrate is damaged by high temperature, for example, temperature over 100° C. that is generated in the process of forming transistors and light emitting elements due to the characteristic that a material having a small modulus is weak to heat.

Accordingly, light emitting elements should be formed on a substrate made of a material that may withstand high temperature, so damage to the substrate may be reduced in the process of manufacturing the light emitting elements. Accordingly, there have been attempts to manufacture a substrate using materials that may withstand high temperature, which is generated in the manufacturing process, such as Polyimide (PI). However, materials that may withstand high temperature are not flexible due to large moduli, so substrates are not easily bent or stretched when stretching stretchable display devices.

Therefore, since the plurality of individual substrates 111 that are rigid substrates is disposed only in the areas where transistors 150 or organic light emitting elements 160 are disposed in the stretchable display device 100 according to an embodiment of the present disclosure, damage to the lower substrate 110 due to high temperature in the process of manufacturing the transistors 150 or the organic light emitting elements 160 may be reduced.

Further, the lower substrate 110 and the upper substrate 120 that are flexible substrates are respectively disposed under and over the plurality of individual substrates 111 in the stretchable display device 100 according to an embodiment of the present disclosure. Accordingly, the other areas of the lower substrate 110 and the upper substrate 120 excepting the areas overlapped with the plurality of individual substrates 111 may be easily stretched or bent, so the stretchable display device 100 may be achieved. Further, it is possible to reduce damage to the transistors 150, the organic light emitting elements 160, etc., disposed on the plurality of individual substrates 111 that are rigid substrates when the stretchable display device 100 is bent or stretched.

Effect of Connecting Line

When a stretchable display device is bent or stretched, a lower substrate that is a flexible substrate is deformed and individual substrates that are rigid substrates on which organic light emitting elements are disposed may not be deformed. In this case, if the lines connecting the pads disposed on the plurality of individual substrates are not made of an easily bendable or stretchable material, the lines may be damaged, such as cracking, due to deformation of the lower substrate.

However, in the stretchable display device 100 according to an embodiment of the present disclosure, it is possible to electrically connect the pads disposed on the plurality of individual substrates 111, using the connecting lines 180 including a base polymer and conductive particles. The base polymer is flexible to be able to easily deform. Accordingly, according to the stretchable display device 100 of an embodiment of the present disclosure, even though the stretchable display device 100 is deformed such as bending or stretching, the areas between the plurality of individual substrates 111 are easily deformed by the connecting lines 180 including the base polymer.

Further, according to the stretchable display device 100 of an embodiment of the present disclosure, since the connecting lines 180 include conductive particles, the conductive paths composed of the conductive particles may not be damaged such as cracking even by deformation of the base polymer. For example, when the stretchable display device 100 is deformed such as bending or stretching, the lower substrate 110 that is a flexible substrate may be deformed in the other areas excepting the areas where the plurality of individual substrates 111 that are rigid substrates are disposed. The distance between the plurality of conductive particles disposed on the deforming lower substrate 110 may be changed. The density of the plurality of conductive particles disposed at the upper portion of the base polymers and forming the conductive paths may be maintained at a high level to be able to transmit electrical signals even though the distance between the plurality of conductive particles is increased. Accordingly, even if the base polymers are bent or stretched, the conductive paths formed by the plurality of conductive particles may smoothly transmit electrical signals. Further, even though the stretchable display device 100 is deformed such as bending or stretching, electrical signals may be transmitted between the pads.

In the stretchable display device 100 according to an embodiment of the present disclosure, since the connecting lines 180 include a base polymer and conductive particles, the connecting lines 180 connecting the pads disposed on the plurality of individual substrates 111 adjacent to each other may be disposed straight to have a minimum length. That is, the stretchable display device 100 may be achieved even if the connecting lines 180 are not curved. The conductive particles of the connecting lines 180 are distributed in the base polymers and form conductive paths. When the stretchable display device 100 is deformed such as bending or stretching, the conductive paths formed by the conductive particles may be bent or stretched. In this case, only the distance between the conductive particles is changed and the conductive paths formed by the conductive particles may still transmit electrical signals. Therefore, in the stretchable display device 100 according to an embodiment of the present disclosure, it is possible to minimize the space occupied by the connecting lines 180.

Meanwhile, connecting lines are disposed on various components on a plurality of individual substrates spaced apart from each other on a lower substrate, for example, on the top surface of a bank. Further, the connecting lines may be connected with pads through contact holes formed at the bank and an insulating layer disposed under the bank. In this case, the connecting lines extend toward the lower substrate from the edge of an individual substrate and extend to an adjacent individual substrate, so the connecting lines may have a large step between the top surface of the bank and the top surface of the lower substrate. For example, since the individual substrates may have a large thickness of about 6 μm, the connecting lines may have a large step at the edges of the individual substrates. In this case, the base polymer itself may be cut by a step of the base polymer of the connecting lines, so the electrical path between the pads disposed on adjacent individual substrates may be cut and a percentage defective of the stretchable display device may increase.

Therefore, in the stretchable display device 100 according to an embodiment of the present disclosure, contact holes CT are formed at the insulating layers 112, 113, and 114 and the individual substrate 111 disposed under the gate pad 171 and the data pad 173. Thereafter, the connecting line 180 disposed on the bottom surface of the individual substrate 111 is electrically connected with the gate pad 171 and the data pad 173 through the contact holes CT. Accordingly, the connecting line 180 may not have a step. Therefore, damage to the connecting line 180 due to a step of the connecting line 180 is reduced, so reliability of the stretchable display device 100 may be improved.

Although the pads that are connected by the connecting line 180 are the gate pad 171 and the data pad 173 in the description referring to FIGS. 1 to 3, the present disclosure is not limited thereto.

Hereafter, FIGS. 4A to 4G are also referred to for describing a method of manufacturing the stretchable display device 100 according to an embodiment of the present disclosure.

Method of Manufacturing Stretchable Display Device According to Embodiment

FIG. 4A to 4G are process cross-sectional views illustrating a method of manufacturing a stretchable display device according to an embodiment of the present disclosure.

Figure 4A:
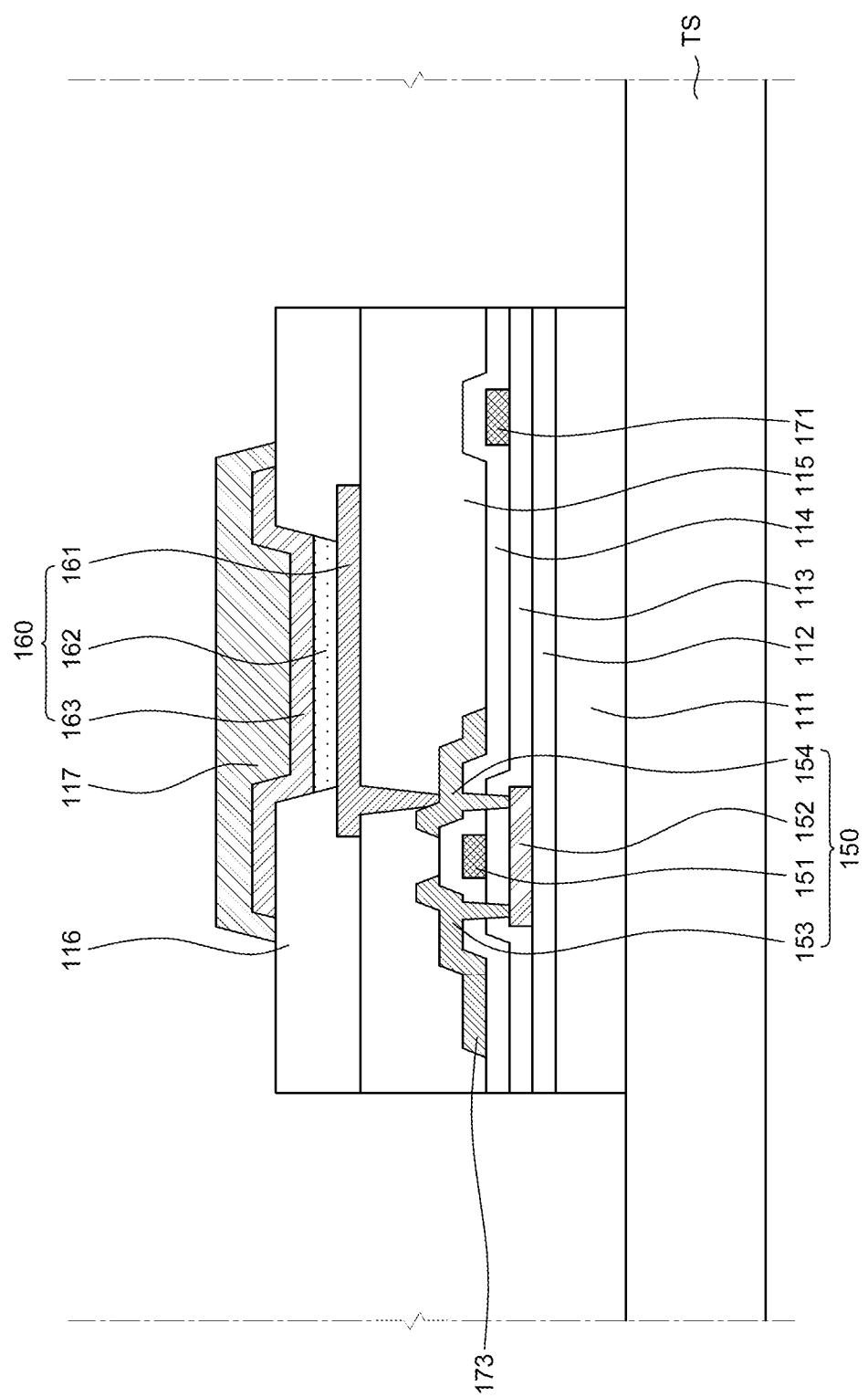
FIG. 4A to 4G are process cross-sectional views illustrating a method of manufacturing a stretchable display device according to an embodiment of the present disclosure.

First, referring to FIG. 4A, an individual substrate 111 is disposed on a temporary substrate TS, and a plurality of insulating layers including a buffer layer 112, a gate insulating layer 113, an inter-layer insulating layer 114, a planarization layer 115, a bank 116, and an encapsulation layer 117 that are sequentially formed, and a subpixel including a transistor 150 and an organic light emitting element 160 are formed on the individual substrate 111.

Figure 4B:
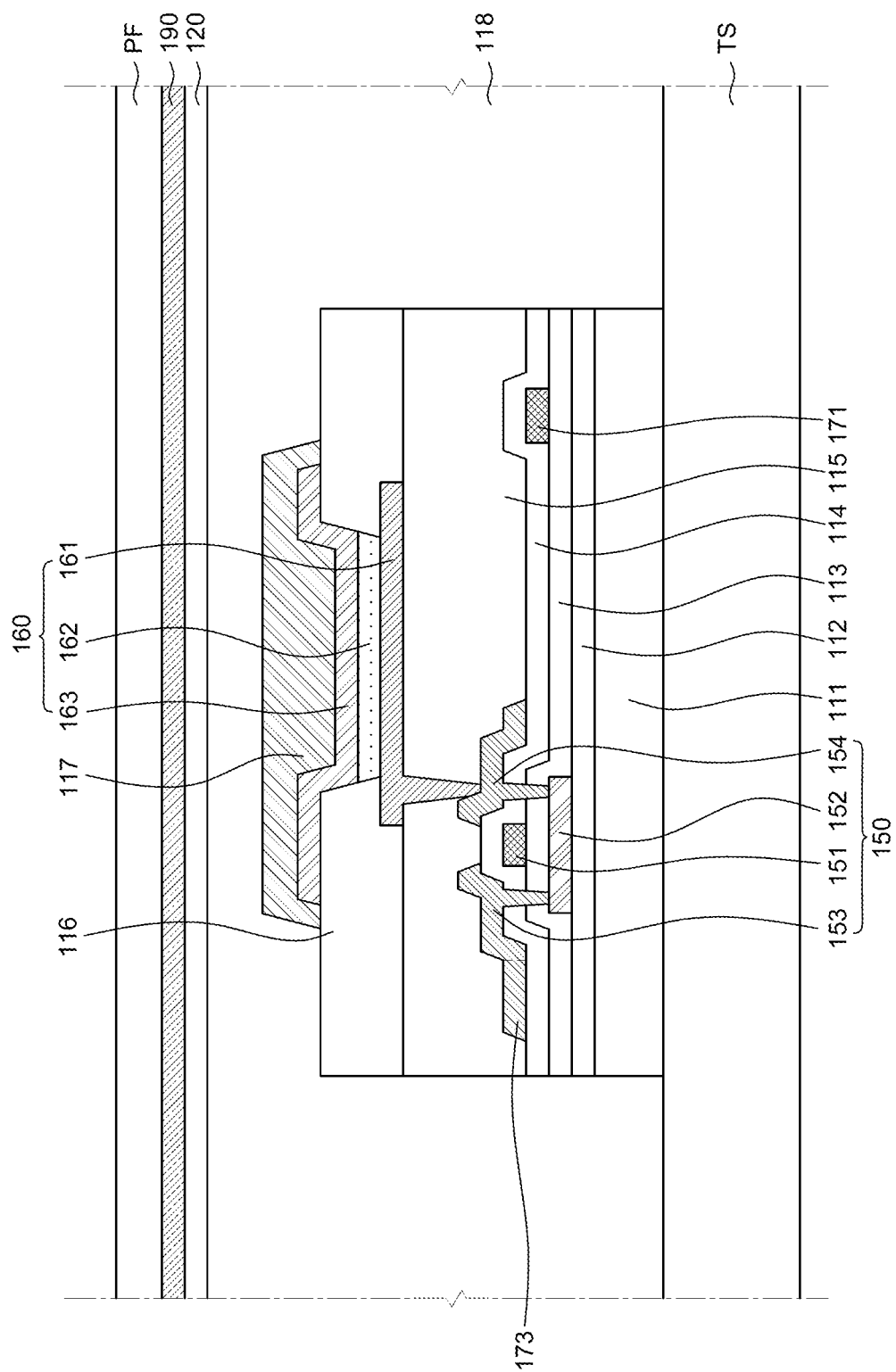

Thereafter, as shown in FIG. 4B, an upper adhesive layer 118 is disposed on the bottom surface of an upper substrate 120 to bond the temporary substrate TS and the upper substrate 120. Thereafter, the upper substrate 120 and a polarizing layer 190 are bonded to the temporary substrate TS using the upper adhesive layer 118. However, the present disclosure is not limited thereto. That is, it may be possible to coat a material for the upper substrate 120 onto the temporary substrate TS without the separate upper adhesive layer 118, form the upper substrate 120 by hardening the material, and then dispose the polarizing layer 190 on the upper substrate 120.

A protective film PF for protecting the upper substrate 120 and the polarizing layer 190 may be disposed on the upper substrate 120 and the polarizing layer 190 in the process of manufacturing the stretchable display device 100. The protective film PF may be a film made of plastic, but protective glass made of glass, etc., may be used.

Figure 4C:
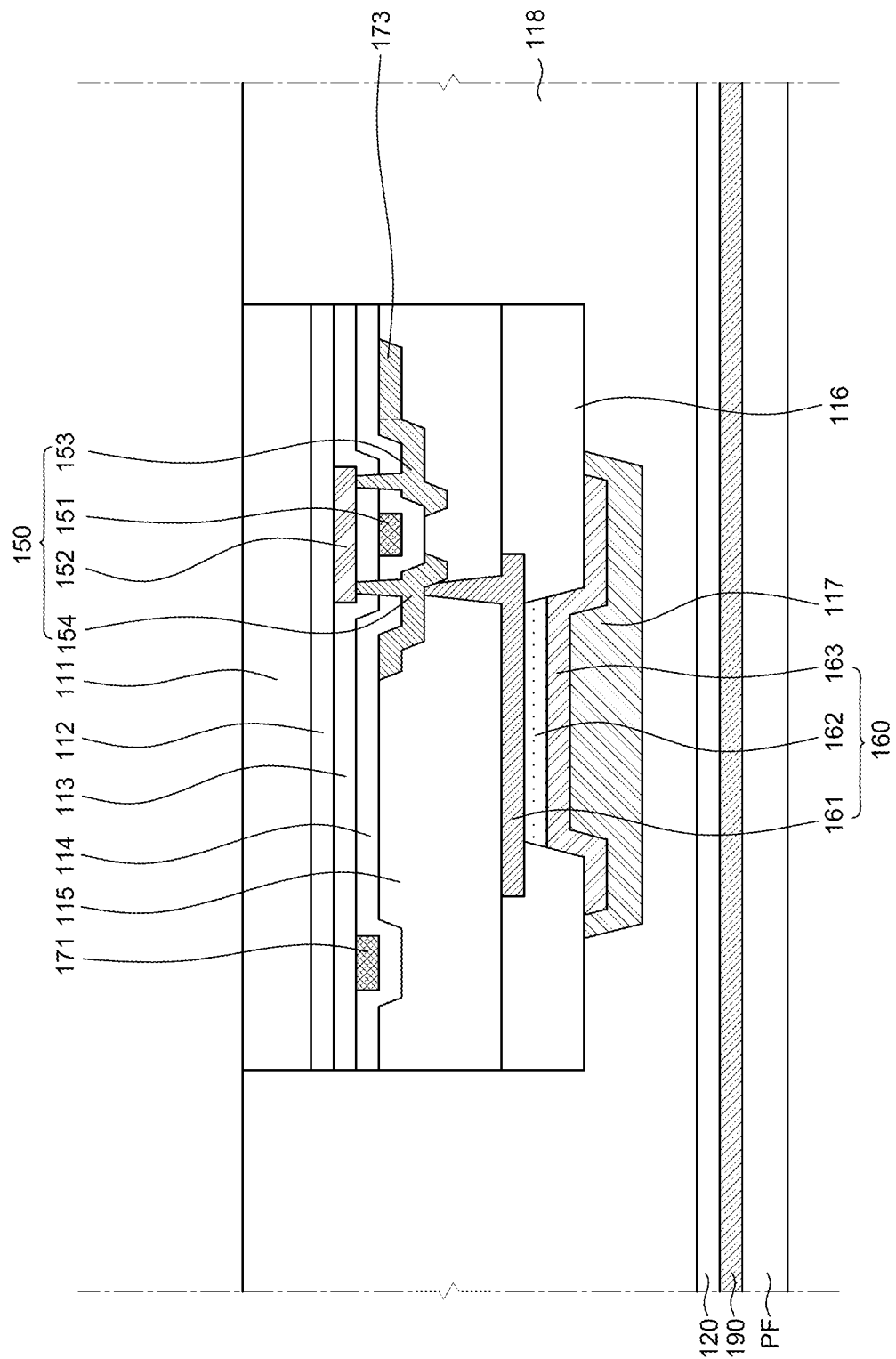

Thereafter, as shown in FIG. 4C, the temporary substrate TS disposed under the individual substrate 111 and the upper adhesive layer 118 is removed, and then the components including the organic light emitting element 160, the transistor 150, the individual substrate 111, the upper substrate 120, the polarizing layer 190, and the protective film PF are turned over. However, the present disclosure is not limited thereto and a process of turning over the components and then removing the temporary substrate TS may be performed.

Figure 4D:
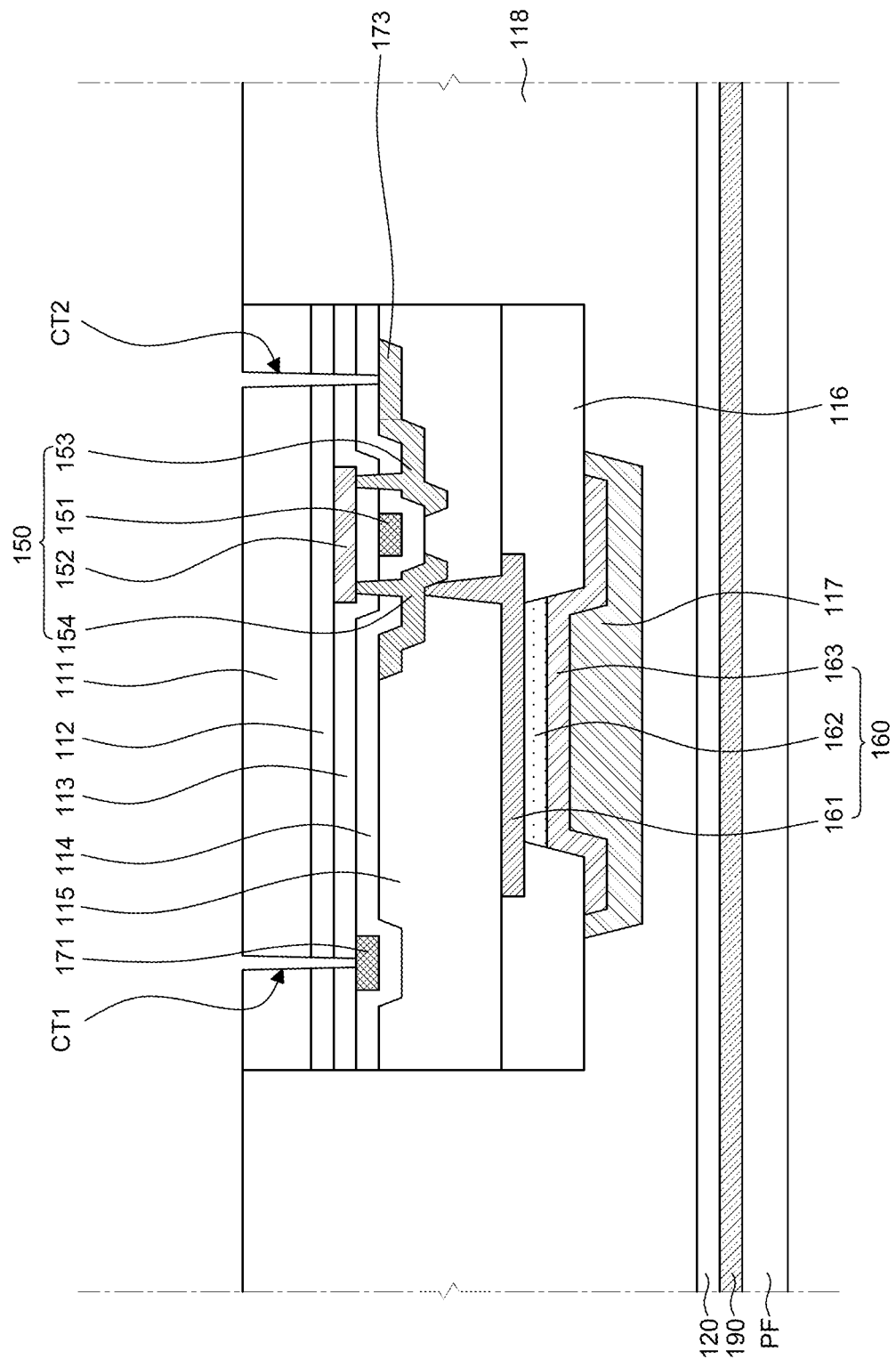

Thereafter, as shown in FIG. 4D, a first contact hole CT1 is formed through the individual substrate 111, the buffer layer 112, and the gate insulating layer 113 to correspond to the area where the gate pad 171 is formed in order that the gate pad 171 is exposed. Further, a second contact hole CT2 is formed through the individual substrate 111, the buffer layer 112, the gate insulating layer 113, and the inter-layer insulating layer 114 to correspond to the area where the data pad 173 is formed in order that the data pad 173 is exposed. The contact holes CT may be formed by a dry etching process or a laser process. Accordingly, the cross-sectional area of the contact hole CT may decrease toward the pads 171 and 173 from a connecting line 180.

Figure 4E:
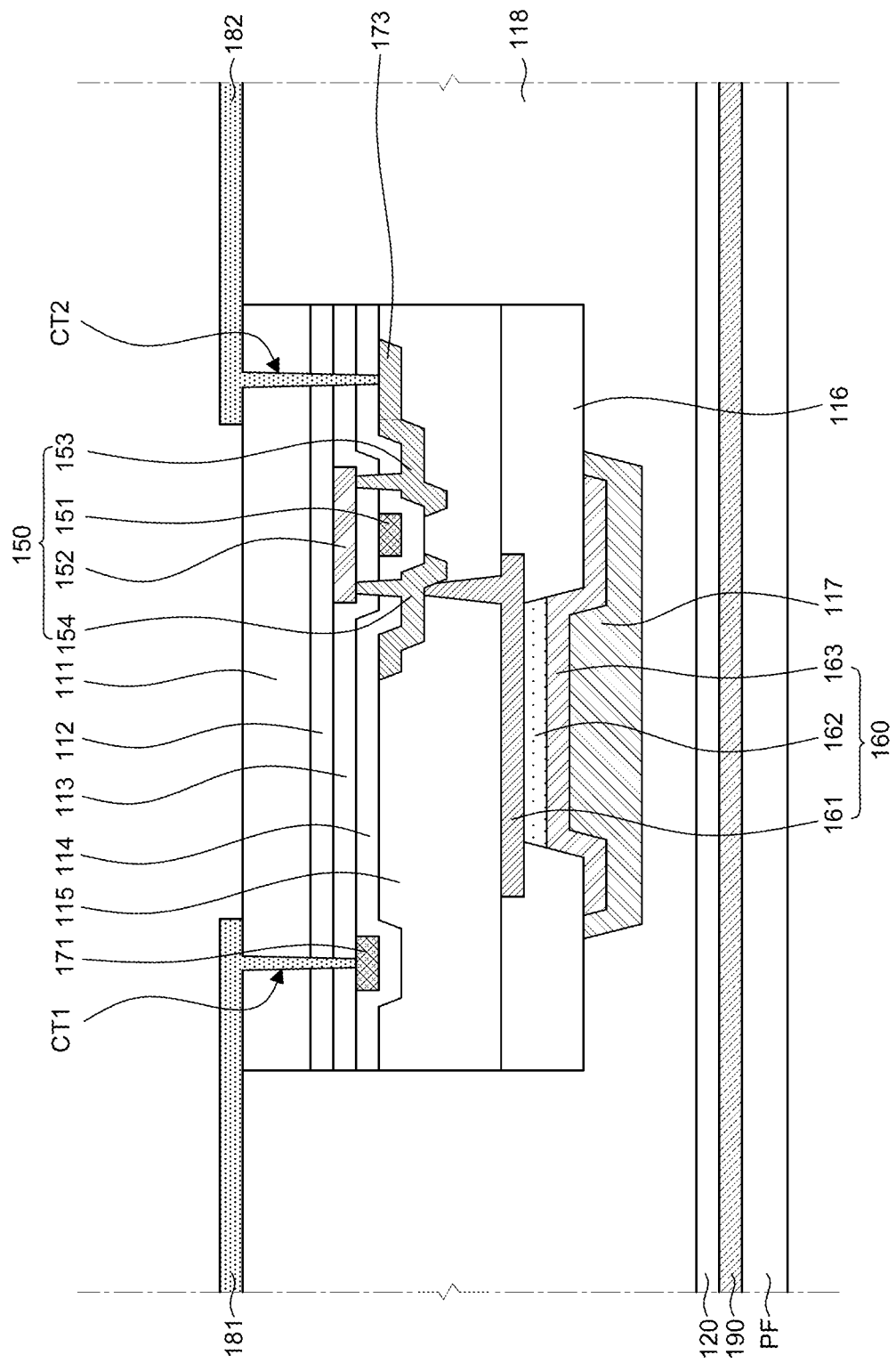

Thereafter, as shown in FIG. 4E, a first connecting line 181 is formed under the first contact hole CT1, the individual substrate 111 having the first contact hole CT1, and the upper adhesive layer 118. Further, a second connecting line 182 is formed under the second contact hole CT2, the individual substrate 111 having the second contact hole CT2, and the upper adhesive layer 118. Accordingly, the first connecting line 181 may extend on the bottom surfaces of the individual substrate 111 and the upper adhesive layer 118 in contact with the gate pad 171 through the first contact hole CT1. Further, the second connecting line 182 may extend on the bottom surfaces of the individual substrate 111 and the upper adhesive layer 118 in contact with the data pad 173 through the second contact hole CT2.

The first connecting line 181 and the second connecting line 182 may be simultaneously formed. That is, the first connecting line 181 and the second connecting line 182 may be simultaneously formed, with the contact hole CT formed, by coating a base polymer with conductive particles distributed therein to the bottom surfaces of the individual substrate 111 and the upper adhesive layer 118 and then hardening the base polymer.

Figure 4F:
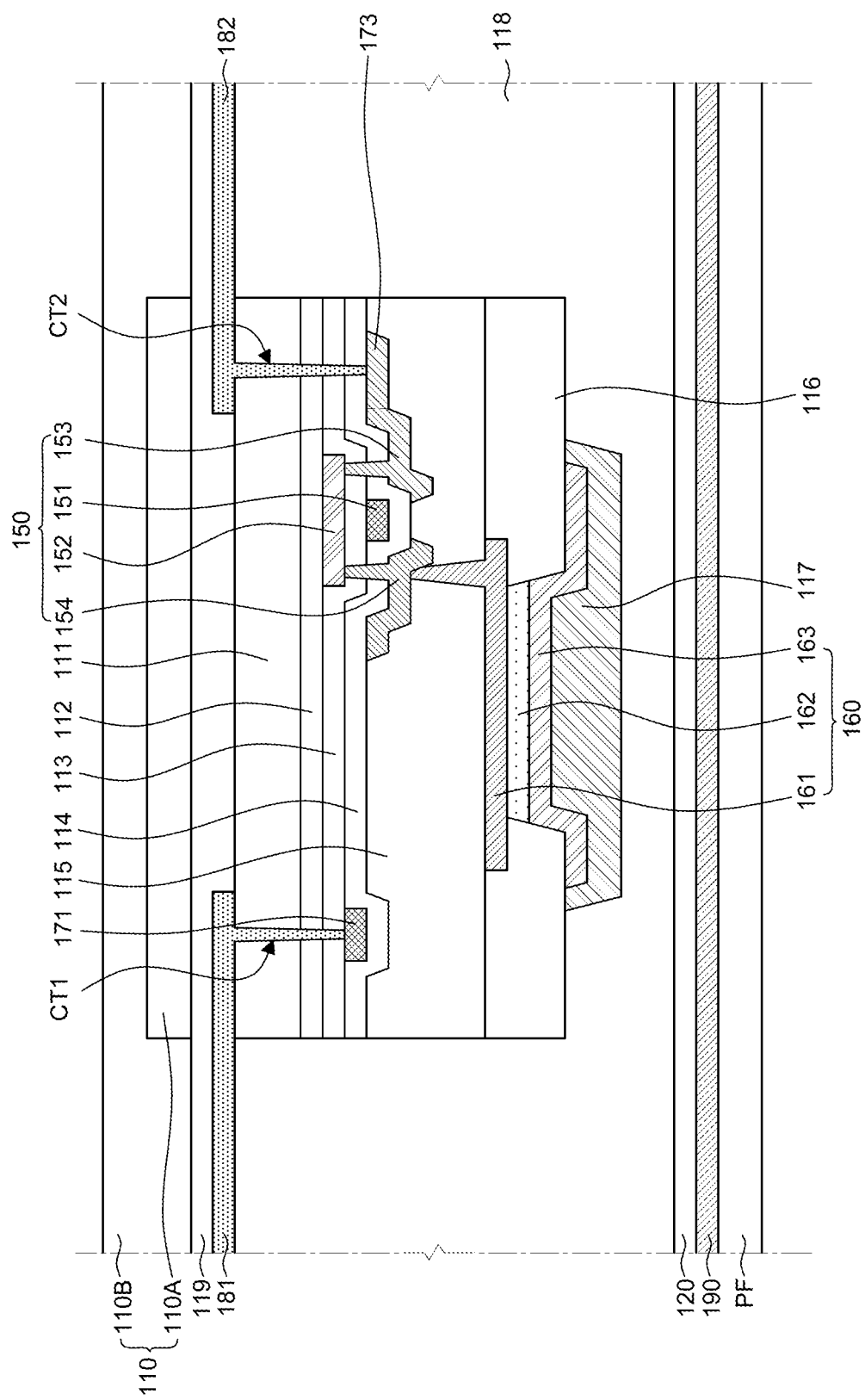

Thereafter, as shown in FIG. 4F, a lower substrate 110 may be bonded to the bottom surfaces of the individual substrate 111 and the connecting line 180, using a lower adhesive layer 119. However, the present disclosure is not limited thereto, and the lower adhesive layer 119 may not be provided.

Figure 4G:
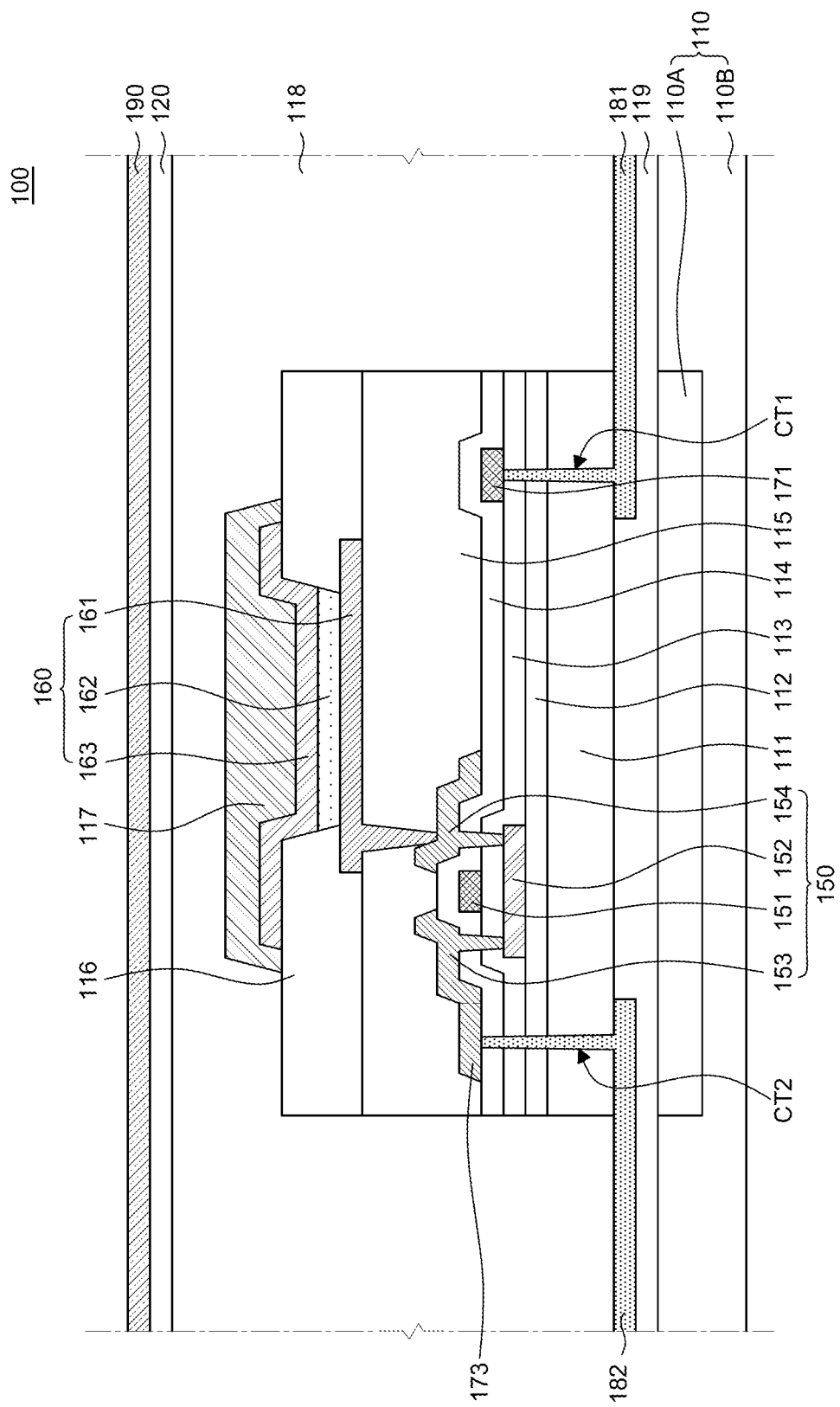

Thereafter, as shown in FIG. 4G, the protective film PF formed on the polarizing layer 190 is removed and then the components are turned back over, thereby achieving the stretchable display device 100 according to an embodiment of the present disclosure.

In the method of manufacturing the stretchable display device 100 according to an embodiment of the present disclosure, it is possible to easily contact the connecting line 180 and the pads 171 and 173 with each other by forming the contact hole CT through the individual substrate 111 and the insulating layers. Accordingly, it is possible to reduce the possibility of damage to the connecting line 180 through a very easy process.

Cross-Sectional Structure According to Another Embodiment

Figure 5:
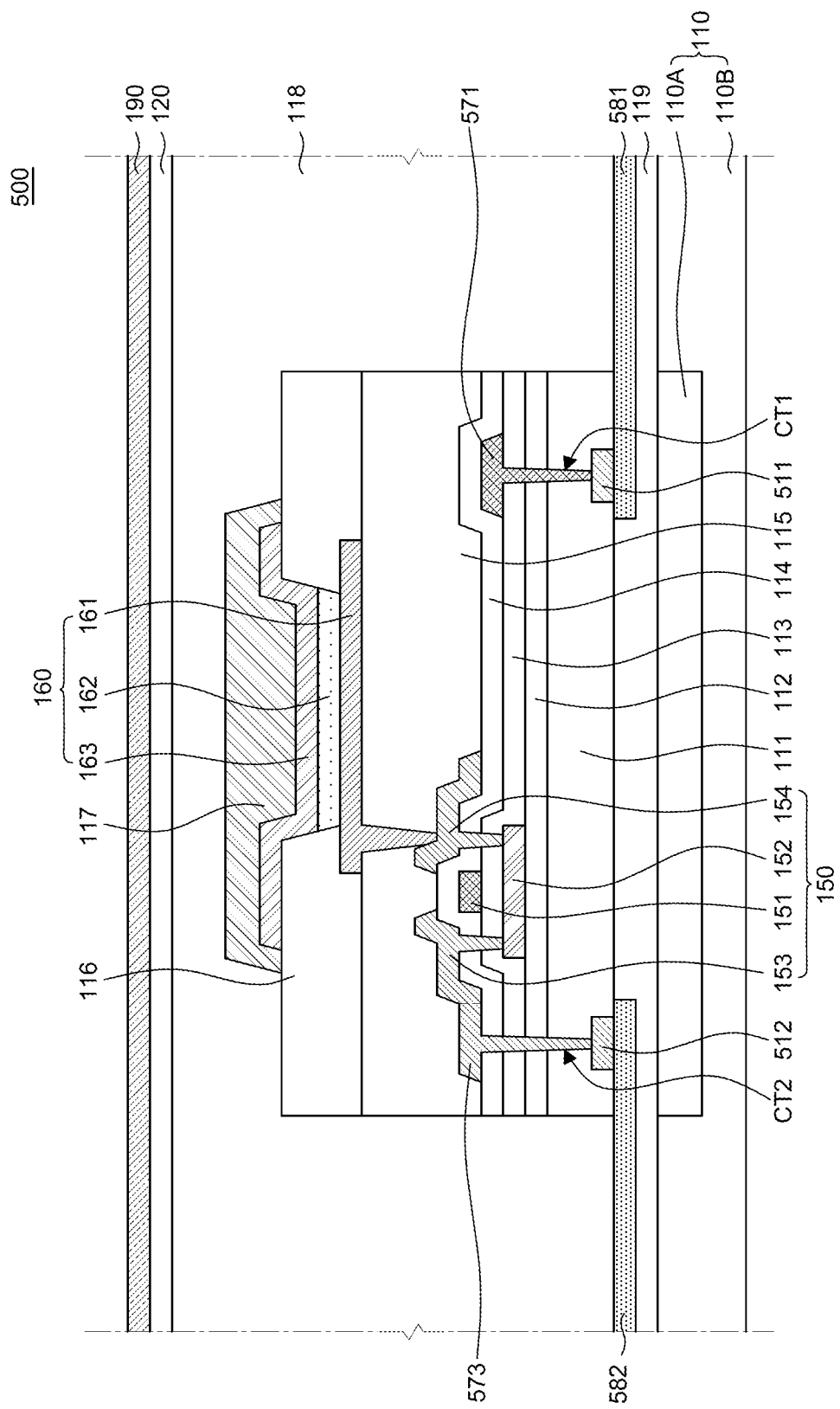
FIG. 5 is a schematic cross-sectional view showing one subpixel of a stretchable display device according to another embodiment of the present disclosure.

FIG. 5 is a schematic cross-sectional view showing one subpixel of a stretchable display device according to another embodiment of the present disclosure. A stretchable display device 500 shown in FIG. 5 is substantially the same as the stretchable display device 100 shown in FIGS. 1 to 3 except for including different connecting line 580, gate pad 571, and data pad 573 and further including a conductive contact pad 510, so repeated description is not provided.

Referring to FIG. 5, a conductive contact pad 510 is disposed on the lower substrate 110 in the stretchable display device 500 according to another embodiment of the present disclosure. The conductive contact pad 510 is covered with the individual substrate 111. Further, the conductive contact pad 510 may be disposed in an area corresponding to a gate pad 571 and a data pad 573 disposed on the individual substrate 111. Since the individual substrate 111 is disposed to cover the conductive contact pad 510, the bottom surfaces of the conductive contact pad 510 and the individual substrate 111 may be disposed in the same plane. The conductive contact pad 510 may be made of a conductive material.

The conductive contact pad 510 includes a first conductive contact pad 511 electrically connected with the gate pad 571 and a second conductive contact pad 512 electrically connected with the data pad 573.

The first conductive contact pad 511 may be electrically connected with the gate pad 571 through a first contact hole CT1 and the second conductive contact pad 512 may be electrically connected with the data pad 573 through the second contact hole CT2. The first conductive contact pad 511 may function as a portion of a gate line by being connected with a first connecting line 581 and the second conductive contact pad 512 may function as a portion of a data line by being connected with a second connecting line 582.

The individual substrate 111 is disposed on the conductive contact pad 510, and a buffer layer 112 and a gate insulating layer 113 are sequentially disposed on the individual substrate 111. An active layer 152 of a transistor 150 is disposed on the buffer layer 112, the gate pad 571 is disposed on the gate insulating layer 113 to correspond to the first conductive contact pad 511, and a gate electrode 151 is disposed to overlap the active layer 152 of the transistor 150. The gate pad 571 is in contact with the first conductive contact pad 511 through the first contact hole CT1 formed through the individual substrate 111, the buffer layer 112, and the gate insulating layer 113. A gate pad-forming material may be disposed in the first contact hole CT1 when the gate pad 571 is formed.

An inter-layer insulating layer 114 is disposed on the gate insulating layer 113 having the gate pad 171 and the gate electrode 151, and the data pad 573 is disposed on the inter-layer insulating layer 114 to correspond to the second conductive contact pad 512. The data pad 573 may be made of the same material as a source electrode 153 and a drain electrode 154 of the transistor 150, and the source electrode 153 may extend. The data pad 573 is electrically connected with the second conductive contact pad 512 through the second contact hole CT2 formed through the individual substrate 111, the buffer layer 112, the gate insulating layer 113, and the inter-layer insulating layer 114. A data pad-forming material may be disposed in the second contact hole CT2 when the data pad 573 is formed.

The connecting line 580 may be disposed under the individual substrate 111 to be in contact with the conductive contact pad 510. In detail, as shown in FIG. 5, the first connecting line 581 may have a flat surface under the individual substrate 111 in contact with the first conductive contact pad 511 connected with the gate pad 571. The second connecting line 582 may have a flat surface under the individual substrate 111 in contact with the second conductive contact pad 512 connected with the data pad 573.

In the stretchable display device 500 according to another embodiment of the present disclosure, the individual substrate 111 is disposed to cover the conductive contact pad 510 and then the connecting line 580 is disposed on the bottom surface of the individual substrate 111. Accordingly, the connecting line 580 is electrically connected with the gate pad 571 and the data pad 573 through the conductive contact pad 510. Therefore, the connecting line 580 may have a flat surface. That is, the connecting line 580 has a uniform height from the lower substrate for its entire length. As a result, there is no step in the connecting line 580, so the connecting line 580 may be stably formed and reliability of the display device 500 may be improved.

Hereafter, FIGS. 6A to 6G are also referred to for describing a method of manufacturing a stretchable display device 500 according to another embodiment of the present disclosure.

Method of Manufacturing Stretchable Display Device According to Another Embodiment FIG. 6A to 6G are process cross-sectional views illustrating a method of manufacturing a stretchable display device according to another embodiment of the present disclosure.

Figure 6A:
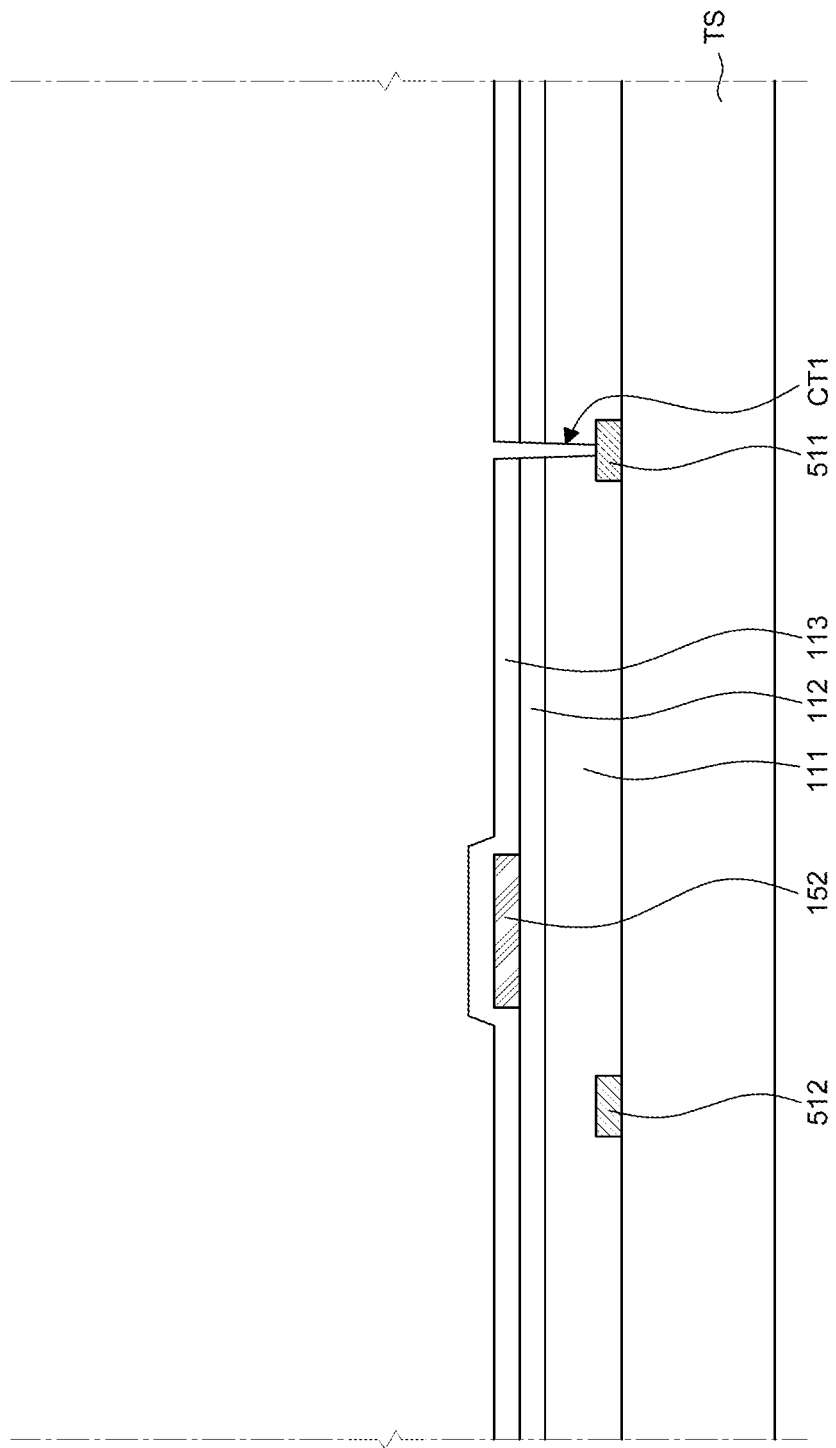
FIG. 6A to 6G are process cross-sectional views illustrating a method of manufacturing a stretchable display device according to another embodiment of the present disclosure.

First, referring to FIG. 6A, a first conductive contact pad 511 and a second conductive contact pad 512 are formed on a temporary substrate TS. The first conductive contact pad 511 and the second conductive contact pad 512 are formed with a predetermined distance therebetween.

An individual substrate 111 and a buffer layer 112 are sequentially formed on the temporary substrate TS having the first conductive contact pad 511 and the second conductive contact pad 512, and then an active layer 152 of a transistor 150 is formed. A gate insulating layer 113 is formed on the buffer layer 112 having he active layer 152 and then a first contact hole CT1 is formed through the individual substrate 111, the buffer layer 112, and the gate insulating layer 113 to expose the first conductive contact pad 511. The first contact hole CT1 may be formed by a dry etching process or a laser process. Accordingly, the cross-sectional area of the first contact hole CT1 may increase as it goes away from the first conductive contact pad 511.

Figure 6B:
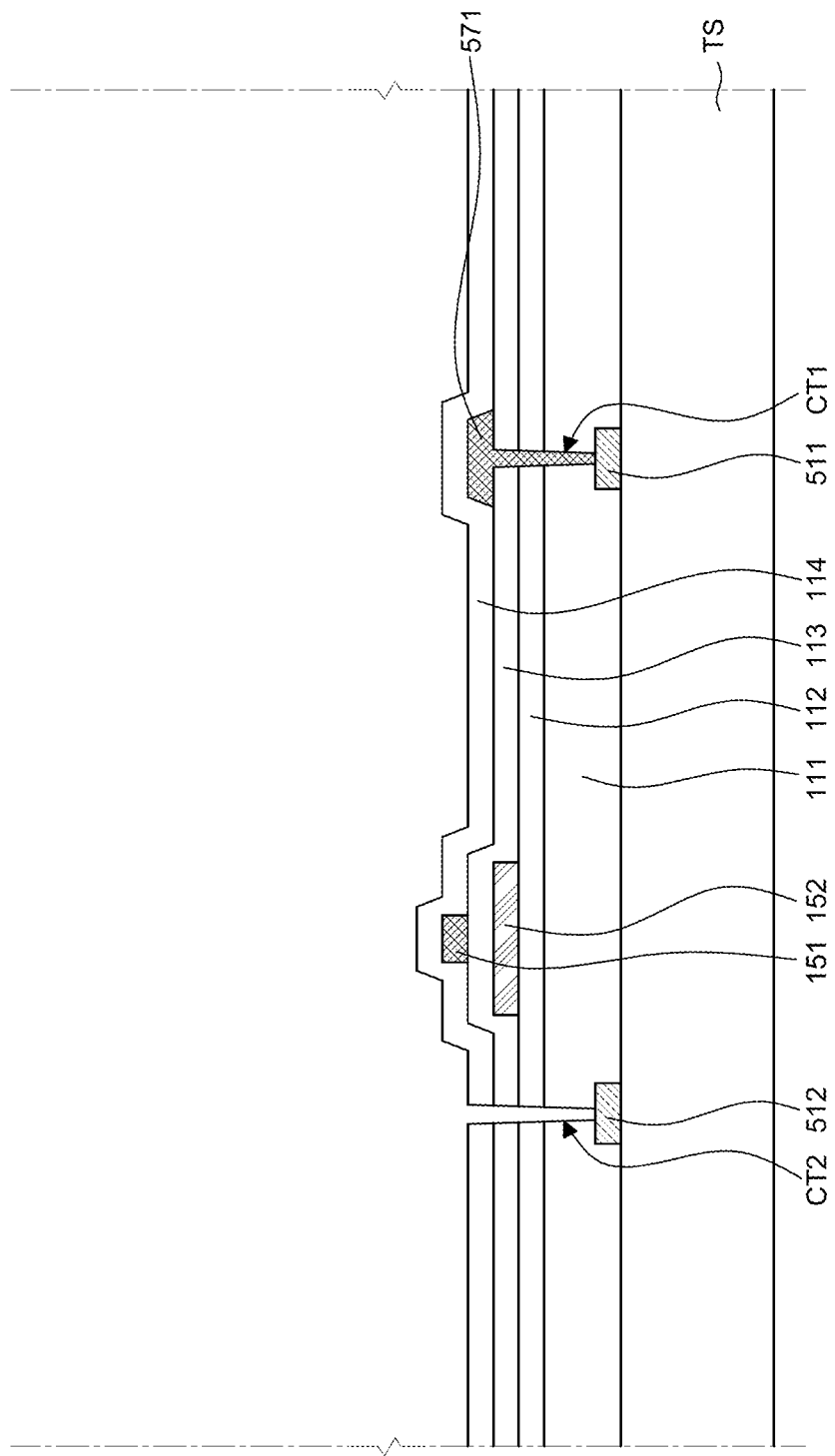

Thereafter, as shown in FIG. 6B, a gate pad 571 that is connected with the first conductive contact pad 511 through the first contact hole CT1 is disposed and a gate electrode 151 is formed in an area overlapped with the active layer 152 of the transistor 150.

An inter-layer insulating layer 114 is formed on the gate insulating layer 113 having the gate electrode 151 and the gate pad 571. Thereafter, a second contact hole CT2 is formed through the individual substrate 111, the buffer layer 112, the gate insulating layer 113, and the inter-layer insulating layer 114 to expose the second conductive contact pad 512. The second contact hole CT2 may be formed by a dry etching process or a laser process. Accordingly, the cross-sectional area of the second contact hole CT2 may increase as it goes away from the second conductive contact pad 512.

Figure 6C:
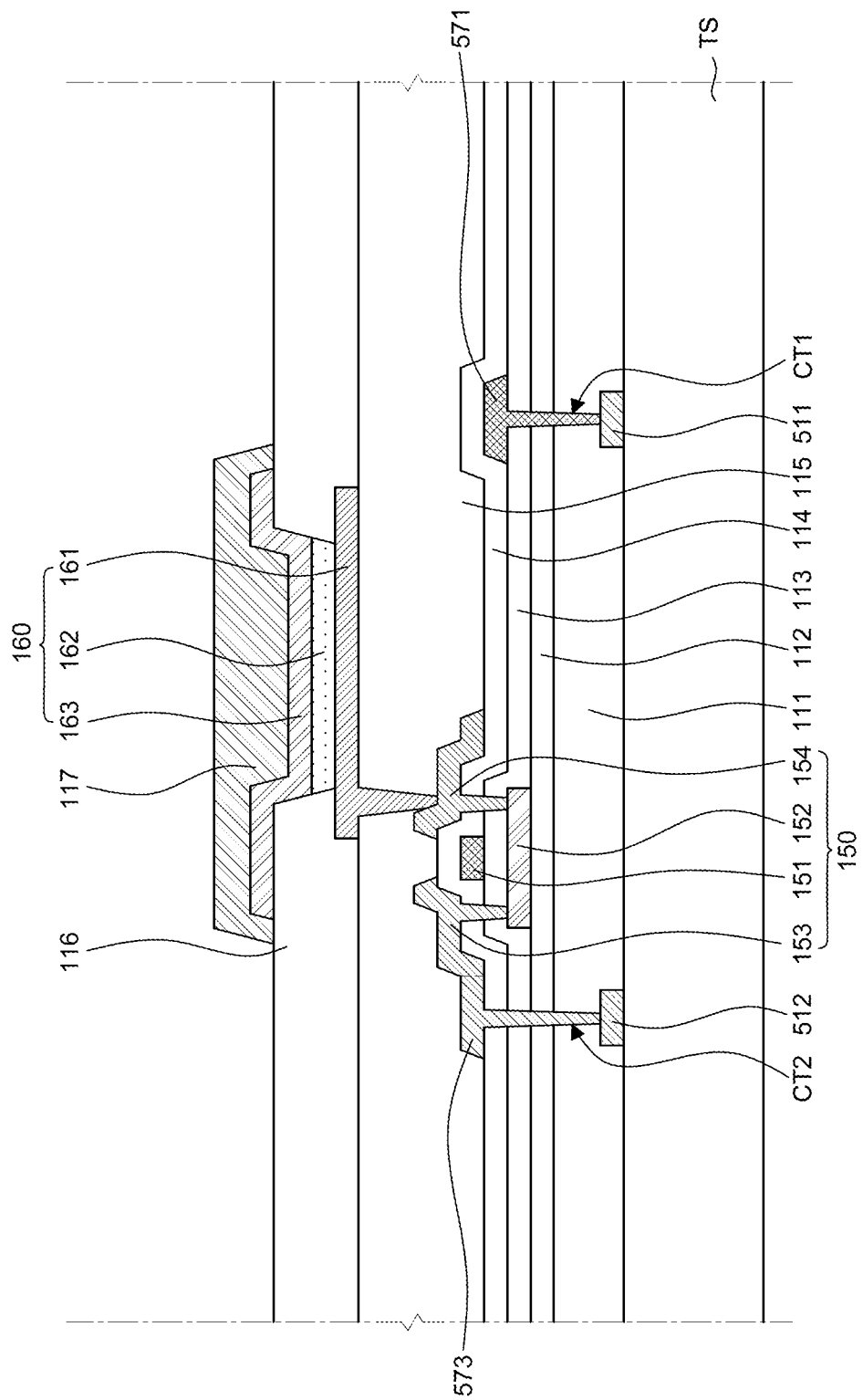

Thereafter, as shown in FIG. 6C, a data pad 573 that is connected with the second conductive contact pad 512 through the second contact hole CT2 is disposed. Further, a source electrode 153 extending from the data pad 573 and a drain electrode 154 spaced apart from the source electrode 153 are formed, thereby achieving the transistor 150. Thereafter, a planarization layer 115, a bank 116, an encapsulation layer 117, and an organic light emitting element 160 are sequentially disposed.

Figure 6D:
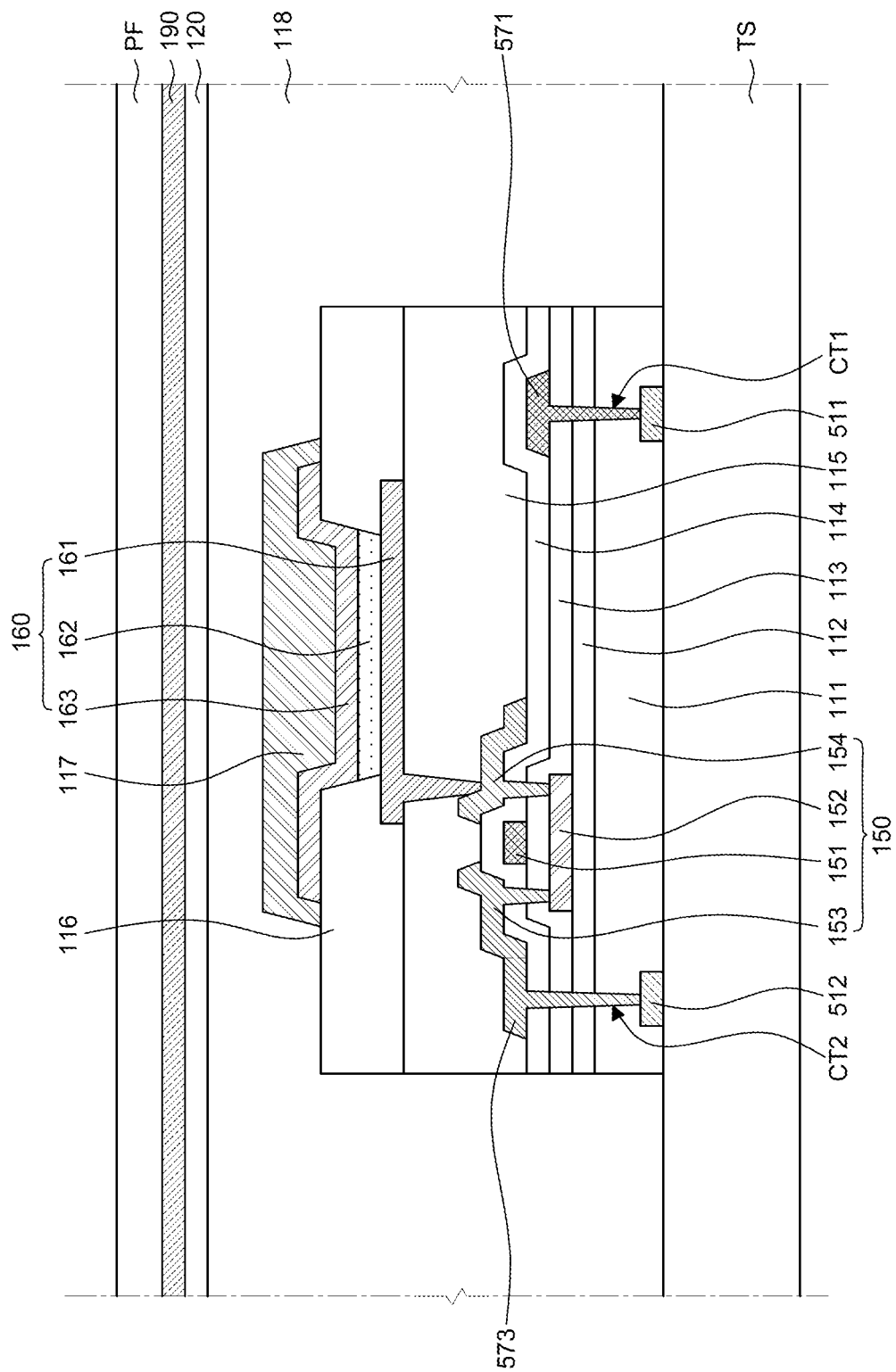

Thereafter, as shown in FIG. 6D, the individual substrate 111, the buffer layer 112, the gate insulating layer 113, the inter-layer insulating layer 114, the planarization layer 115, and the bank layer 116 are cut into a plurality of individual substrates. Thereafter, an upper adhesive layer 118 is disposed on the bottom surface of an upper substrate 120 to bond the temporary substrate TS and the upper substrate 120. Thereafter, the upper substrate 120 and a polarizing layer 190 are bonded to the temporary substrate TS using the upper adhesive layer 118.

Figure 6E:
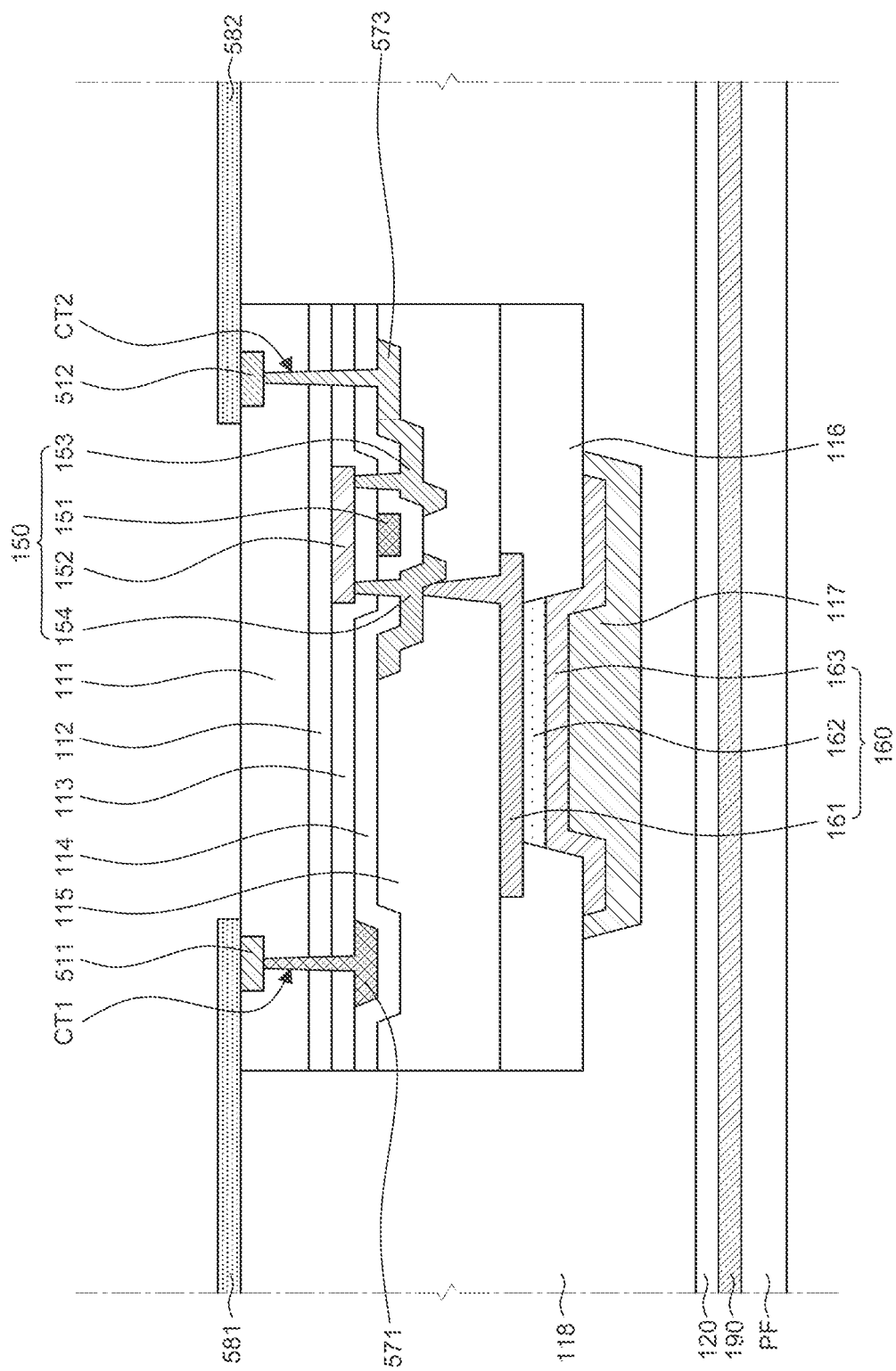

Thereafter, as shown in FIG. 6E, the temporary substrate TS disposed under the individual substrate 111 and the upper adhesive layer 118 is removed, and then the components including the organic light emitting element 160, the transistor 150, the individual substrate 111, the upper substrate 120, the polarizing layer 190, and the protective film PF are turned over.

Thereafter, a first connecting line 581 and a second connecting line 582 are formed to be electrically connected with the first conductive contact pad 511 and the second conductive contact pad 512 exposed by removing the temporary substrate TS. The first connecting line 581 and the second connecting line 582 extend from some area of the bottom surface of the individual substrate 111 corresponding to the first conductive contact pad 511 and the second conductive contact pad 512 to an area of the bottom surface of the upper adhesive layer 118. In other words, the first connecting line 581 and the second connecting line 582 may extend from some area of the bottom surface of the individual substrate 111 respectively corresponding to the first conductive contact pad 511 and the second conductive contact pad 512 to the area of the upper adhesive layer 118. The conductive contact pad 510 and the individual substrate 111 provide a flat bottom, so the connecting line 580 may be formed in a flat surface without a step. That is, the connecting line 580 has a uniform height from the lower substrate for its entire length.

Figure 6F:
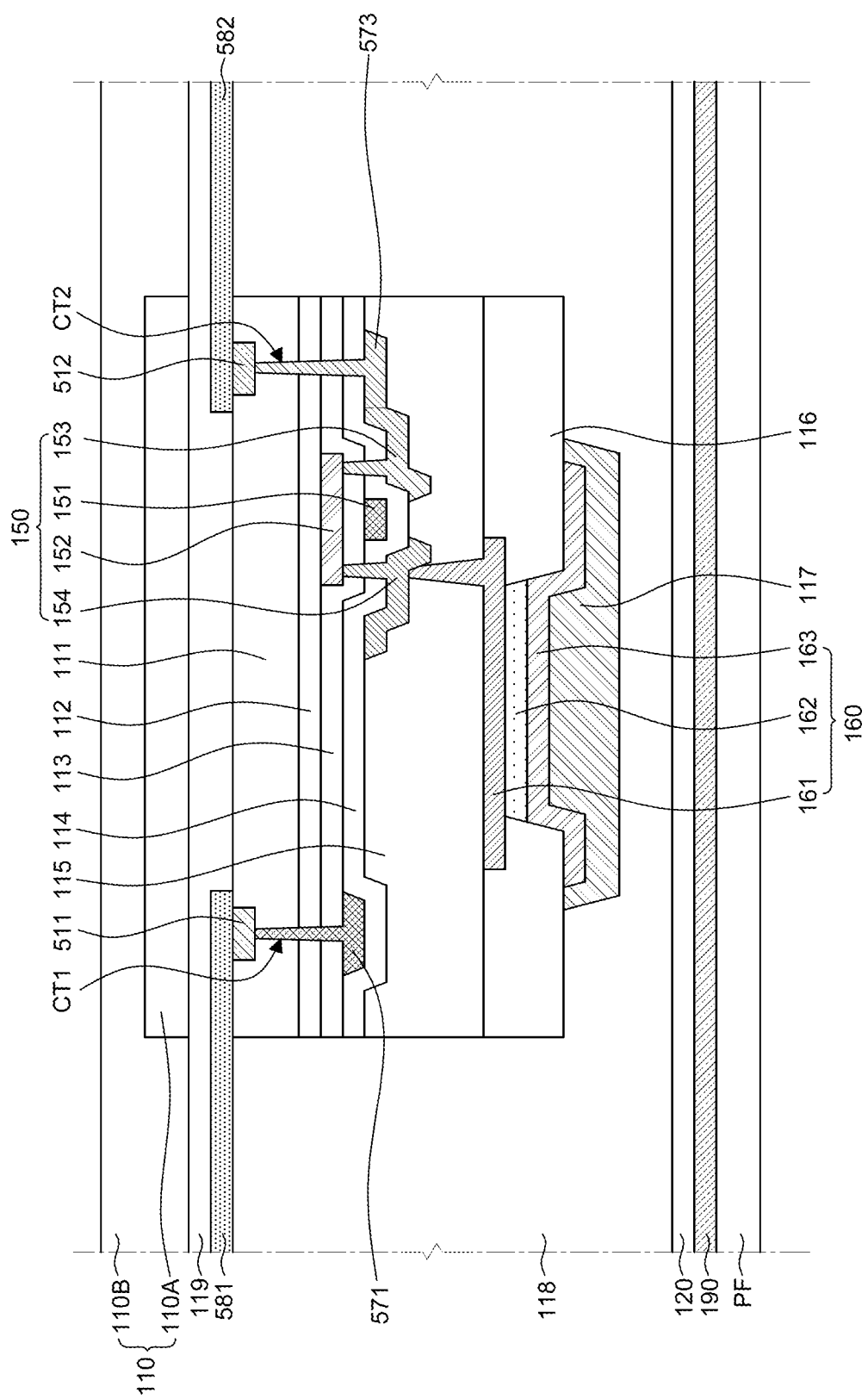

Thereafter, as shown in FIG. 6F, a lower substrate 110 may be bonded to the bottom surfaces of the individual substrate 111 and the connecting line 180, using a lower adhesive layer 119. However, the present disclosure is not limited thereto, and the lower adhesive layer 119 may not be provided.

Figure 6G:
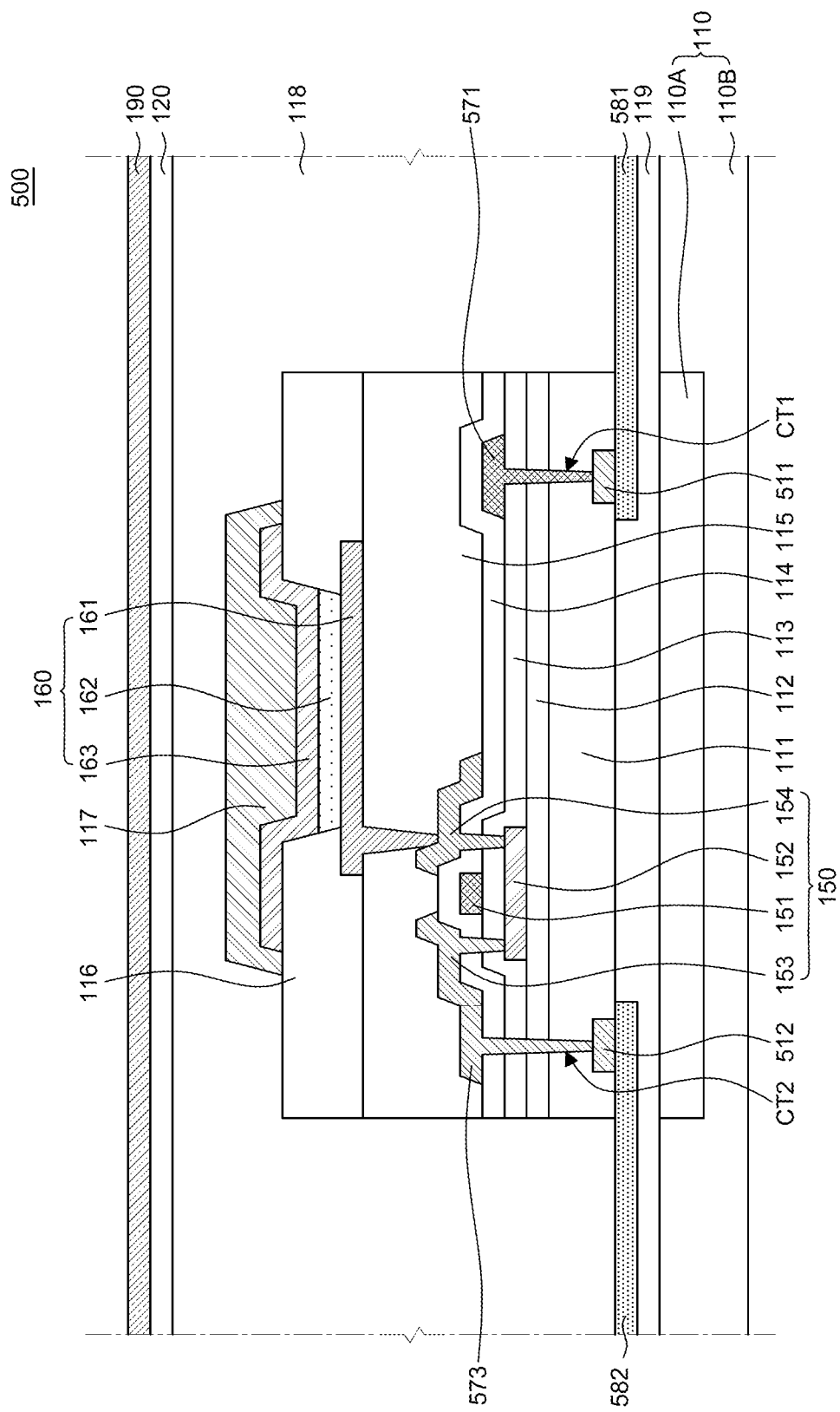

Thereafter, as shown in FIG. 6G, the protective film PF formed on the polarizing layer 190 is removed and then the components are turned back over, thereby achieving the stretchable display device 500 according to another embodiment of the present disclosure.

In the method of manufacturing the stretchable display device 500 according to another embodiment of the present disclosure, the conductive contact pad 510 is formed before the individual substrate 111 is disposed, and then the individual substrate 111 is disposed to cover the conductive contact pad 510. Accordingly, it is possible to reduce the depth of the contact hole CT that is supposed to be formed later in the process of forming the contact hole CT, by the thickness of the conductive contact pad 510. Therefore, the process of forming the contact hole CT may become easier. Further, in the method of manufacturing the stretchable display device 500 according to another embodiment of the present disclosure, since the individual substrate 111 is disposed to cover the conductive contact pad 510, the individual substrate 111 and the conductive contact pad 510 provide a flat bottom. Accordingly, the connecting line 580 may have a flat surface without a step on the bottom surfaces of the individual substrate 111 and the conductive contact pad 510. Therefore, in the stretchable display device 500 according to another embodiment of the present disclosure, it is possible to reduce deterioration of reliability of the stretchable display device 500 that may occur due to damage to the connecting line 580.

Connecting Line Made of Conductive Component And Having Curved Shape

Figure 7:
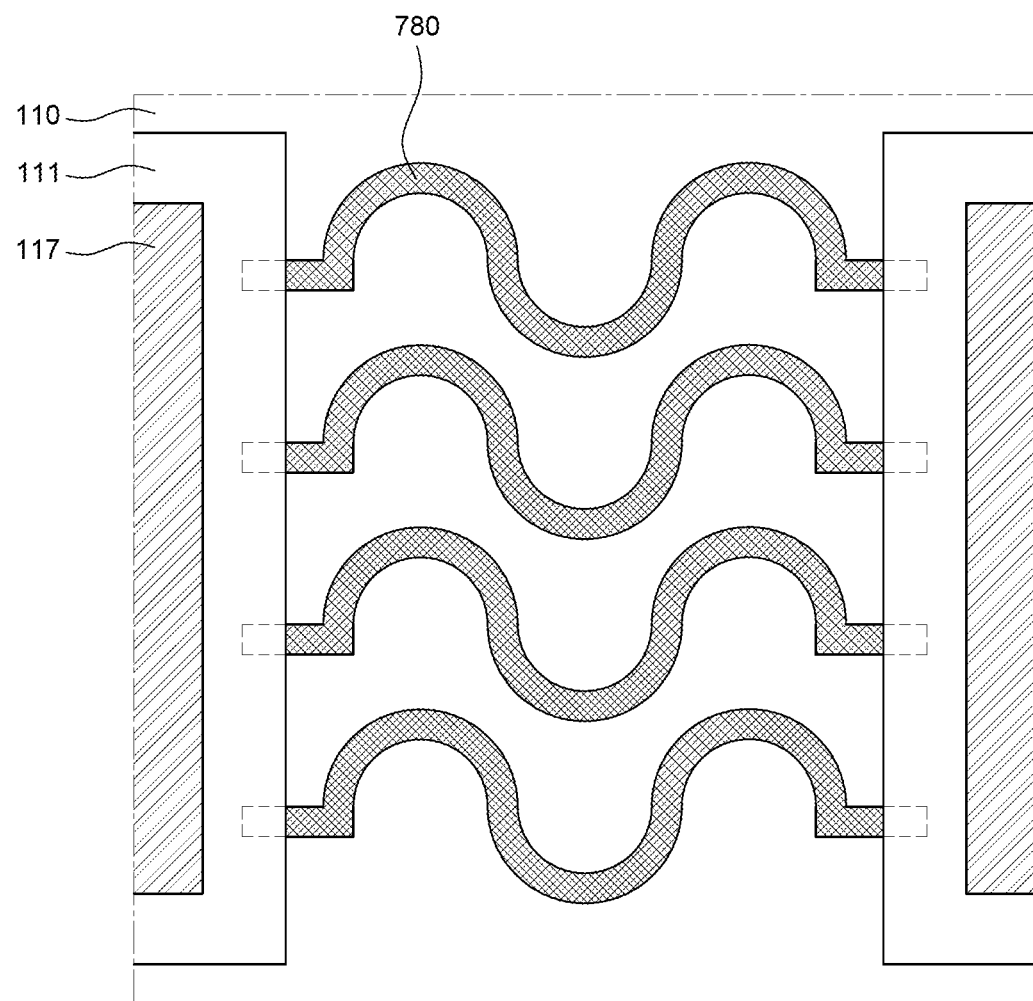
FIG. 7 is a partially enlarged plan view of the stretchable display device according to still another embodiment of the present disclosure.
Figure 8:
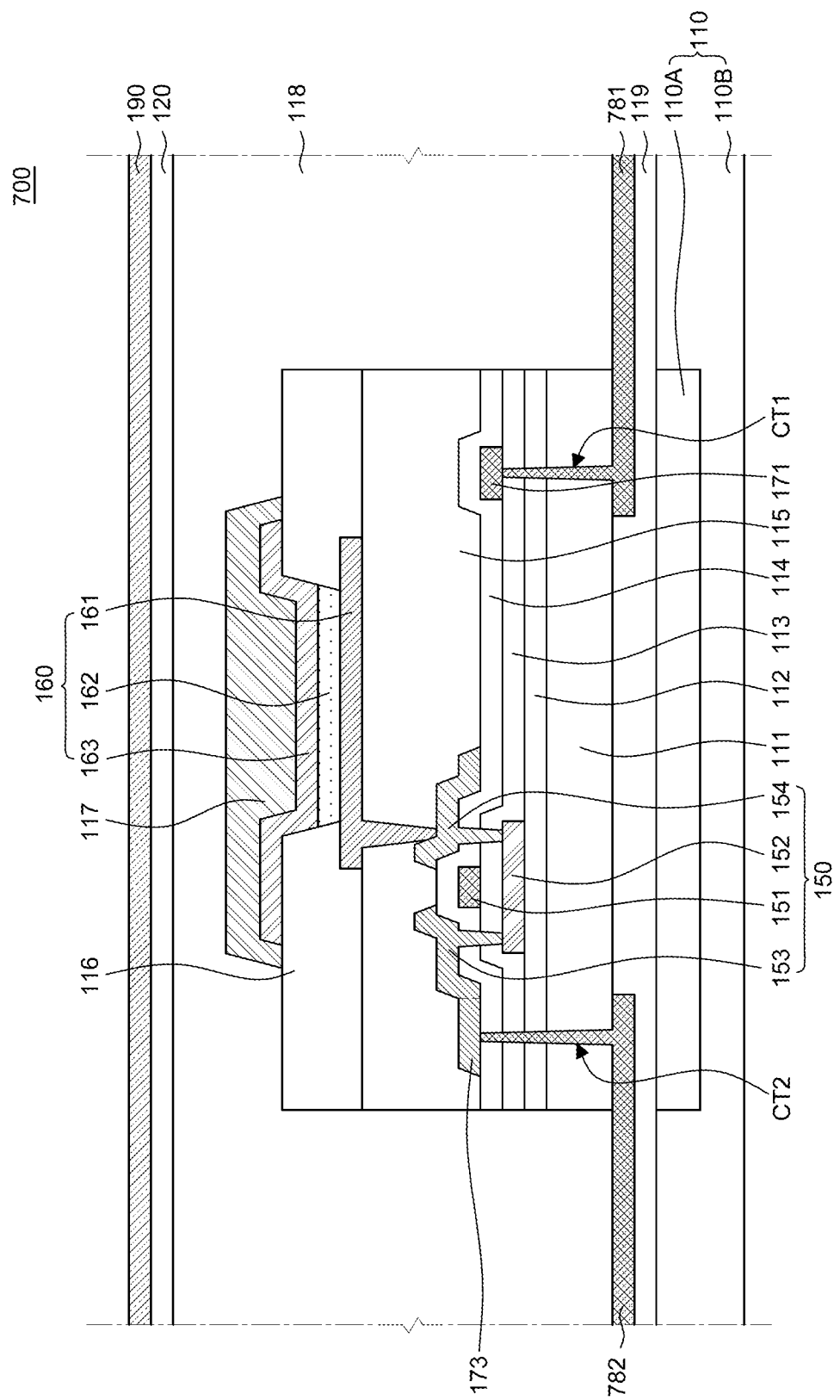
FIG. 8 is a schematic cross-sectional view showing one subpixel of a stretchable display device according to still another embodiment of the present disclosure.

FIG. 7 is a partially enlarged plan view of the stretchable display device according to still another embodiment of the present disclosure. FIG. 8 is a schematic cross-sectional view showing one subpixel of a stretchable display device according to still another embodiment of the present disclosure. A stretchable display device 700 shown in FIGS. 7 and 8 is substantially the same as the stretchable display device 100 shown in FIGS. 1 to 3 except for having different connecting lines 780, so repeated description is not provided. Only encapsulation layers 117 and connecting lines 780 of various components disposed on individual substrates 111 are shown in FIG. 7 for the convenience of description.

Referring to FIG. 7, the connecting lines 780 of a stretchable display device 700 according to still another embodiment of the present disclosure have a curved shape, for example, a curved shape means wave shape or a diamond shape. The connecting lines 780 electrically connect the pads disposed on adjacent individual substrates 111 of a plurality of individual substrates 111 and extend not in a straight line, but in a curved shape between the pads. For example, as shown in FIG. 7, the connecting lines 780 may have a sine waveform. However, the connecting lines 780 are not limited to this shape and may have various shapes. For example, the connecting lines 780 may extend in a zigzag shape or a plurality of diamond-shaped connecting lines extend with the apexes connected.

Referring to FIG. 8, a gate pad 171 is formed on the gate insulating layer 113, a first connecting line 781 is formed in some area of the first lower pattern 110A of the lower substrate 110 and on the second lower pattern 110B. Further, the gate pads 171 and the first connecting line 781 may be electrically connected through a first contact hole CT1 formed through the gate insulating layer 113, the buffer layer 112, and the individual substrate 111.

Accordingly, referring to FIG. 8, the first connecting line 781 that may function as a gate line may electrically connect the gate pads 171 formed on adjacent individual substrates 111. The first connecting line 781 is in contact with individual substrates 111 and the lower adhesive layer 118 between the plurality of individual substrates 111.

The first connecting line 781 may be made of the same material as the gate electrode 151 and the gate pad 171. However, the first connecting line 781 is not limited thereto and may be made of a conductive material different from the gate electrode 151 and the gate pad 171.

Referring to FIG. 8, a data pad 173 is formed on the inter-layer insulating layer 114. A source electrode 153 may extend outside an individual substrate 111, may function as the data pad 173, and may be electrically connected with the second connecting line 782. However, the present disclosure is not limited thereto and the data pad 173 electrically connected with the source electrode 153 may be separately formed.

The second connecting line 782 is formed in some area of the first lower pattern 110A of the lower substrate 110 and on the second lower pattern 110B. The data pad 173 and the second connecting line 782 may be electrically connected through the second contact hole CT2 formed through the inter-layer insulating layer 114, the gate insulating layer 113, the buffer layer 112, and the individual substrate 111.

The second connecting line 782 may be made of the same material as the first connecting line 781. Accordingly, the second connecting line 782 and the first connecting line 781 may be simultaneously formed in the same process. That is, the second connecting line 782 may be made of the same material as the first connecting line 781, the gate electrode 151, and the gate pad 171. The first connecting line 781 and the second connecting line 782 are made of the same material as the gate electrode 151 and the gate pad 171 in the stretchable display device 700 according to still another embodiment of the present disclosure. However, the present disclosure is not limited thereto, the first connecting line 781 and the second connecting line 782 may be made of the same material as or a different conductive material from the source electrode 153, the drain electrode 154, and the data pad 173.

A step may be generated in the connecting lines disposed on a plurality of individual substrates and the connecting lines disposed on a lower substrate due to the thickness of various components disposed on the plurality of individual substrates. Accordingly, the connecting lines may be disconnected by a crack due to a step.

However, the connecting lines 780 are formed in a flat surface without a step in contact with a portion of the bottom surface of the individual substrate 111 and the bottom surface of the upper adhesive layer 118 in the stretchable display device 700 according to still another embodiment of the present disclosure. That is, the connecting lines 780 has a uniform height from the lower substrate for its entire length. Accordingly, it is possible to reduce damage to the connecting lines 780 and improve reliability of the stretchable display device 700.

Stretchable Display Device Including Micro LED

Figure 9:
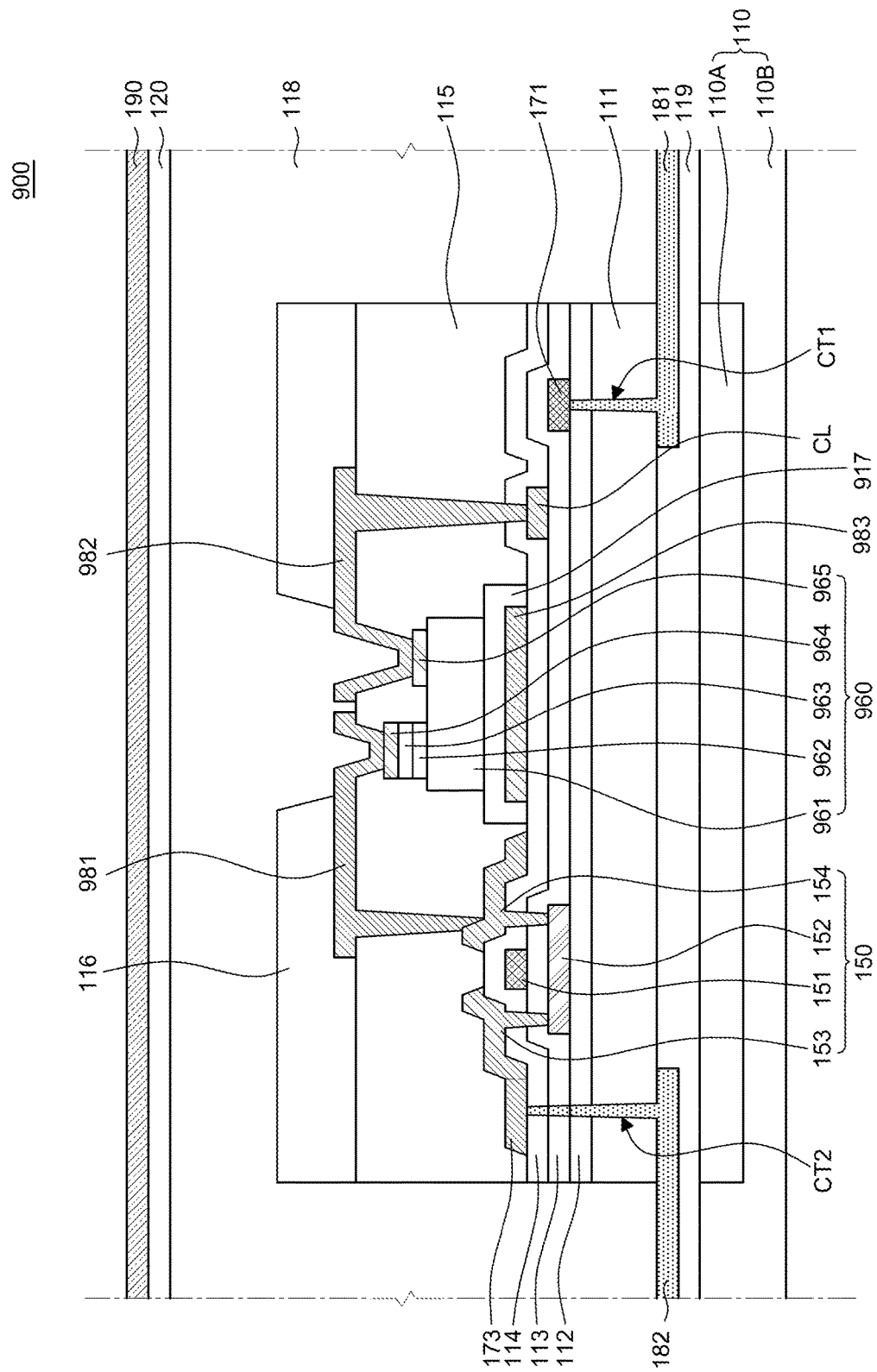
FIG. 9 is a schematic cross-sectional view showing one subpixel of a stretchable display device according to still another embodiment of the present disclosure.

FIG. 9 is a schematic cross-sectional view showing one subpixel of a stretchable display device according to still another embodiment of the present disclosure. A stretchable display device shown in FIG. 9 is substantially the same as the stretchable display device 100 shown in FIGS. 1 to 3 except for including an micro LED 960, so repeated description is not provided.

Referring to FIG. 9, a common line CL is disposed on the gate insulating layer 113. The common line CL is a line for applying a common voltage to a plurality of subpixels SPX. The common line CL may be made of the same material as the source electrode 153 and the drain electrode 154 of the transistor 150, but is not limited thereto.

A reflective layer 983 is disposed on the inter-layer insulating layer 114. The reflective layer 983 is a layer for discharging light emitted to the lower substrate 110 of light emitting from the LED 960 to the outside by reflecting the light upward through a stretchable display device 900. The reflective layer 983 may be made of metal having high reflectance.

An adhesive layer 917 is disposed on the reflective layer 983 to cover the reflective layer 983. The adhesive layer 917, which is a layer for bonding the LED 960 on the reflective layer 983, may insulate the reflective layer 983 made of metal and the LED 960. The adhesive layer 917 may be made of a thermosetting material or a photocuring material, but is not limited thereto. Although the adhesive layer 917 covers only the reflective layer 983 in FIG. 9, the position of the adhesive layer 917 is not limited thereto.

The LED 960 is disposed on the adhesive layer 917. The LED 960 overlaps the reflective layer 983. The LED 960 includes an n-type layer 961, an active layer 962, a p-type layer 963, an n-electrode 965, and a p-electrode 964. The LED 960 is described as a lateral LED 960 hereafter, but the structure of the LED 960 is not limited thereto.

In detail, the n-type layer 961 of the LED 960 overlaps the reflective layer 983 on the adhesive layer 917. The n-type layer 961 may be formed by injecting an n-type impurity into a gallium nitride having excellent crystallinity. The active layer 962 is disposed on the n-type layer 961. The active layer 962, which is a light emitting layer that emits light in the LED 960, may be made of a nitride semiconductor, for example, an indium gallium nitride. The p-type layer 963 is disposed on the active layer 962. The p-type layer 963 may be formed by injecting a p-type impurity into a gallium nitride. However, the constituent materials of the n-type layer 961, the active layer 962, and the p-type layer 963 are not limited thereto.

The p-electrode 964 is disposed on the p-type layer 963 of the LED 960. The n-electrode 965 is disposed on the n-type layer 961 of the LED 960. The n-electrode 965 is spaced apart from the p-electrode 964. In detail, the LED 960 may be manufactured by sequentially stacking the n-type layer 961, the active layer 962, and the p-type layer 963, etching a predetermined portion of the active layer 962 and the p-type layer 963, and then forming the n-electrode 965 and the p-electrode 964. The predetermined portion is a space for spacing the n-electrode 965 and the p-electrode 964 and the predetermined portion may be etched to expose a portion of the n-type layer 961. In other words, the surface of the LED 960 where the n-electrode 965 and the p-electrode 964 are disposed is not a planarized surface and may have different levels. Accordingly, the p-electrode 964 is disposed on the p-type layer 963, the n-electrode 965 is disposed on the n-type layer 961, and the p-electrode 964 and the n-electrode 965 are spaced from each other at different levels. Therefore, the n-electrode 965 may be disposed adjacent to the reflective layer 983 in comparison to the p-electrode 964. The n-electrode 965 and p-electrode 964 may be made of a conductive material, for example, a transparent conductive oxide. Alternatively, the n-electrode 965 and p-electrode 964 may be made of the same material, but are not limited thereto.

A planarization layer 115 is disposed on the inter-layer insulating layer 114 and the adhesive layer 917. The planarization layer 115 is a layer that planarizes the top surface of the transistor 150. The planarization layer 115 may be disposed in an area excepting the area where the LED 960 is disposed while planarizing the top surface of the transistor 150. The planarization layer 115 may be composed of two or more layers.

A first electrode 981 and a second electrode 982 are disposed on the planarization layer 115. The first electrode 981 is an electrode that electrically connects the transistor 150 and the LED 960. The first electrode 981 is connected with the p-electrode 964 of the LED 960 through a contact hole formed at the planarization layer 115. The first electrode 981 is connected with the drain electrode 154 of the transistor 150 through contact holes formed at the planarization layer 115. However, the first electrode 981 is not limited thereto and may be connected with the source electrode 153 of the transistor 150, depending on the type of the transistor 150. The p-electrode 964 of the LED 960 and the drain electrode 154 of the transistor 150 may be electrically connected by the first electrode 981.

The second electrode 982 is an electrode that electrically connects the LED 960 and the common line CL. In detail, the second electrode 982 is connected with the common line CL through contact holes formed at the planarization layer 115 and the inter-layer insulating layer 114 and is connected with the n-electrode 965 of the LED 960 through a contact hole formed at the planarization layer 115. Accordingly, the common line CL and the n-electrode 965 of the LED 960 are electrically connected.

When a stretchable display device 900 is turned on, voltages having different levels may be supplied respectively to the drain electrode 154 of the transistor 150 and the common line CL. The voltage that is applied to the drain electrode 154 of the transistor 150 may be applied to the first electrode 981 and a common voltage may be applied to the second electrode 982. Voltages having different levels may be applied to the p-electrode 964 and the n-electrode 965 through the first electrode 981 and the second electrode 982, so the LED 960 may emit light.

Although the transistor 150 is electrically connected with the p-electrode 964 and the common line CL is electrically connected with the n-electrode 965 in the description referring to FIG. 9, they are not limited thereto. That is, the transistor 150 may be electrically connected with the n-electrode 965 and the common line CL may be electrically connected with the p-electrode 964.

A bank 116 is disposed on the planarization layer 115, the first electrode 981, and a second electrode 982. The bank 116 is disposed to overlap an end of the reflective layer 983 and a portion not overlapped with the bank 116 of the reflective layer 983 may be defined as a light emitting area. The bank 116 may be made of an organic insulating material and may be made of the same material as the planarization layer 115. The bank 116 may include a black material to reduce mixing of colors due to light emitted from the LED 960 and transmitted to an adjacent subpixel SPX.

The stretchable display device 900 according to still another embodiment of the present disclosure includes the LED 960. Since the LED 960 is made of not an organic material, but an inorganic material, reliability is high, so the lifespan is longer than that of a liquid crystal display element or an organic light emitting element. The LED 960 is quickly turned on, consumes a small amount of power, has high stability because it has high shock-resistance, and may display high-luminance images because it has high emission efficiency. Accordingly, the LED 960 is an element that is suitable to be applied even to very large screens. In particular, since the LED 960 is made of not an organic material, but an inorganic material, an encapsulation layer that is required when an organic light emitting element is used may not be used. Accordingly, the encapsulation layer that may be easily damaged, such as cracking, when the stretchable display device 900 is stretched may not be provided. Accordingly, it is possible not to use an encapsulation layer that may be damaged when the stretchable display device 900 according to still another embodiment of the present disclosure is deformed such as bending and stretching, by using the LED 960 as a light emitting element in the stretchable display device 900. Further, since the LED 960 is made of not an organic material, but an inorganic material, the light emitting elements of the stretchable display device 900 according to still another embodiment of the present disclosure may be protected from water or oxygen and their reliability may be high.

The exemplary embodiments of the present disclosure can also be described as follows:

According to an aspect of the present disclosure, there is provided a stretchable display panel, comprising: a lower substrate having an active area and a non-active area surrounding the active area; a plurality of individual substrates disposed on the lower substrate and located in the active area; a plurality of pixels disposed on the plurality of individual substrates; and a connection line disposed between the plurality of individual substrates and the lower substrate, wherein the modulus of the plurality of individual substrates is higher than that of at least one part of the lower substrate, and wherein the connecting line extends to the bottom surface of the individual substrates, such that the connecting line electrically connects a pad disposed on the individual substrates without a step in the top surface of the connecting line.

The lower substrate may include a plurality of first lower patterns overlapped with the plurality of individual substrates and a second lower pattern excepting the plurality of first lower patterns, the modulus of the first lower patterns being higher than that of the second lower pattern.

The second lower pattern may be disposed to surround the sides and the bottom surface of the plurality of first lower pattern.

The connection line electrically may connect with a pad disposed on the individual substrates through a contact hole at the bottom surface of the individual substrates.

The contact hole may be filled with the same material as the connecting line.

Cross-sectional areas of the contact holes may be decreased toward the pads from the connecting lines.

The stretchable display panel may further comprises a conductive contact pad disposed on the lower substrate, wherein the conductive contact pad is covered with the individual substrates, such that the bottom surfaces of the conductive contact pad and the individual substrates are disposed in the same plane, and wherein the connection line electrically connects with a pad disposed on the individual substrates through the conductive contact pad at the bottom surface of the individual substrates.

The pad may include a gate pad and a data pad.

The connecting line may include a base polymer and conductive particles distributed in the base polymer, the conductive particles forming a conductive path of a straight shape.

The base polymer may be formed as a single layer between adjacent individual substrates on the lower substrate, the conductive particles forming a plurality of conductive path in the single layer of base polymer.

The connecting lines may be made of the same material as at least one of conductive patterns constituting an emitting element and have a curved shape.

The connecting lines may have a flat surface.

The conductive particles may be distributed with a density gradient, such that conductivity by conductive particles is maximum at the upper portion of the base polymer.

According to another aspect of the present disclosure, there is provided a method of manufacturing a stretchable display device, the method comprising: disposing a plurality of individual substrates on a temporary substrate; forming a transistor and a emitting element on one surface of the plurality of individual substrates; disposing a protective film on the emitting element and removing the temporary substrate; forming a first connecting line and a second connecting line, which are respectively electrically connected with a gate pad and a data pad, on another surface of the plurality of individual substrates; and forming a lower substrate including a first lower pattern overlapped with the plurality of individual substrates and a second lower pattern surrounding the first lower pattern, wherein the forming a first connecting line and a second connecting line is forming a connecting line having a flat surface without a step. That is, in one embodiment, the connecting lines have a uniform height of their bottom most surface from the lower substrate for their entire length.

The first connecting line and the second connecting line may be made of the same material.

The first connecting line and the second connecting line include a base polymer and conductive particles distributed in the base polymer and have a straight shape.

The first connecting line and the second connecting line may be made of the same material as at least one of conductive patterns disposed on the plurality of individual substrates.

The method may further comprises forming a first contact hole and a second contact hole corresponding to the gate pad and the data pad respectively in the plurality of individual substrates and an insulating layer disposed under the gate pad and the data pad on the plurality of individual substrates.

The forming a lower substrate may include bonding the lower substrate to the bottom surface of the individual substrate using an adhesive layer.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:
a lower substrate having an active area and a non-active area adjacent to the active area;
a plurality of rigid substrates disposed on the lower substrate and spaced apart from each other on the lower substrate;
a plurality of respective pixels disposed on the respectively on plurality of rigid substrates;
a buffer layer disposed on the plurality of rigid substrates;
a connection line disposed between the plurality of rigid substrates and the lower substrate; and
a pad disposed on the buffer layer,
wherein the connection line is electrically connected with the pad through a contact hole formed through the plurality of rigid substrates and the buffer layer.

2. The display device of claim 1, wherein the elastic modulus of the plurality of rigid substrates is higher than that of at least one part of the lower substrate.

3. The display device of claim 1, wherein the lower substrate includes a plurality of first lower patterns overlapping the plurality of rigid substrates and a second lower pattern excepting the plurality of first lower patterns, the elastic modulus of the first lower patterns being higher than that of the second lower pattern.

4. The display device of claim 3, wherein the second lower pattern is disposed to at least partially surround the sides and the bottom surface of the plurality of first lower pattern.

5. The display device of claim 4, wherein cross-sectional areas of the contact holes are decreased toward the pads from the connecting lines.

6. The display device of claim 1, further comprising a conductive contact pad disposed between the connection line and the plurality of rigid substrates,
wherein the conductive contact pad electrically connects with the pad through the contact hole, and is in direct contact with the connection line.

7. The display device of claim 1, wherein the pad includes a gate pad and a data pad.

8. The display device of claim 1, further comprising a transistor including an active layer, a gate electrode overlapping the active layer with a gate insulating layer therebetween, a source electrode, and a drain electrode,
wherein the transistor is disposed on the buffer layer.

9. The display device of claim 8, further comprising an emitting element disposed on the transistor and being electrically connected with the transistor.

10. The display device of claim 9, further comprising an upper substrate disposed on the emitting element and the connection line.

11. The display device of claim 10, further comprising an upper substrate disposed on the emitting element and the connection line.

12. The display device of claim 11, further comprising an adhesive layer disposed between a bottom surface of the upper substrate and a top surface of the connection line and the emitting element.

* * * * *